(12) United States Patent
Galloway

(10) Patent No.: US 12,091,616 B2
(45) Date of Patent: *Sep. 17, 2024

(54) PRODUCTION OF HYDROGEN AND FT PRODUCTS BY STEAM/CO2 REFORMING

(71) Applicant: Raven SR, Inc., Pinedale, WY (US)

(72) Inventor: Terry R. Galloway, Berkeley, CA (US)

(73) Assignee: Raven SR, Inc., Pinedale, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/162,543

(22) Filed: Jan. 31, 2023

(65) Prior Publication Data
US 2024/0124782 A1     Apr. 18, 2024

Related U.S. Application Data

(63) Continuation of application No. 17/299,735, filed as application No. PCT/US2019/065043 on Dec. 6, 2019, now Pat. No. 11,613,706.

(60) Provisional application No. 62/776,203, filed on Dec. 6, 2018.

(51) Int. Cl.
*C10G 2/00*     (2006.01)
*C01B 3/34*     (2006.01)

(52) U.S. Cl.
CPC .............. *C10G 2/32* (2013.01); *C01B 3/346* (2013.01); *C01B 2203/0216* (2013.01); *C01B 2203/0495* (2013.01); *C01B 2203/062* (2013.01); *C01B 2203/1241* (2013.01); *C01B 2203/1258* (2013.01)

(58) Field of Classification Search
CPC ............ C01B 3/346; C01B 2203/0216; C01B 2203/0495; C01B 2203/062; C01B 2203/1241; C01B 2203/1258; C10G 2/32
See application file for complete search history.

(56) References Cited

U.S. PATENT DOCUMENTS 6,103,773 A * 8/2000 Wittenbrink .............. C10L 3/06
                                                        208/950

* cited by examiner

*Primary Examiner* — Jafar F Parsa
(74) *Attorney, Agent, or Firm* — Dentons Bingham Greenebaum LLP; Brian W. Chellgren

(57) ABSTRACT

Process control parameters for production of hydrogen and FT products by steam/$CO_2$ reforming include controlling steam reformer temperature, addition of steam, CO and optionally, biogas. Optimization of parameters have resulted in increased production of $H_2$, removal of sulfur and halogen contaminants, and control of the $H_2$/CO ratio for efficient generation of Fischer-Tropsch products.

18 Claims, 23 Drawing Sheets

PRODUCTION OF HYDROGEN AND FT PRODUCTS BY STEAM/CO2 REFORMING

This application claims the benefit of U.S. patent application Ser. No. 17/299,735, filed 3 Jun. 2021, which is the national stage entry of international application PCT/US2019/065043, filed 6 Dec. 2019, which claims the benefit of priority to U.S. provisional patent application Ser. No. 62/776,203, filed 6 Dec. 2018, each of which is incorporated herein by reference.

FIELD OF THE INVENTION

Various embodiments of the present invention pertain to the use of steam and carbon dioxide in the formation of hydrogen and products of the Fischer-Tropsch (FT) process.

Various embodiments of the present invention pertain to the use of steam and carbon dioxide in the formation of hydrogen and products of the Fischer-Tropsch (FT) process. Various embodiments of the present invention pertain to the use of steam and carbon dioxide in the formation of hydrogen and products of the Fischer-Tropsch (FT) process.

BACKGROUND

There is a great need to destroy a wide range of waste streams generated around the world and at the same time to convert this carbonaceous waste into useful hydrogen-rich syngas to accomplish one or more of the following: (1) production of renewable H2 fuel, (2) to feed an exothermic hydrocarbon synthesis reactor, such as a Fischer-Tropsch module, to produce renewable fuels, or (3) to use a portion of this syngas to drive a fuel cell to power the plant.

Steam/$CO_2$ reforming is often confused with gasification technology. While both processes require heat to drive the endothermic chemistry, the source of that heat is significantly different with considerably different results. An important difference is that gasification uses combustion, while steam/$CO_2$ reforming does not. In gasification, combustion of part of the feedstock produces heat, which has several implications for efficiency, quality, process cleanliness and maintenance. Combusting part of the feedstock makes $CO_2$, which dilutes the resultant syngas by reducing the amount of $H_2$ that is produced. That combustion also consumes part of the syngas further reducing the quantity $H_2$. In most cases, this combustion is driven by adding air, further diluting the $H_2$ by the presence of nitrogen.

In contrast to gasification, the steam/$CO_2$-reforming chemistry used in a steam/$CO_2$ reformer (SR) does not involve combustion, does not utilize oxygen, and does not require the addition of air to the system. The idealized main chemical reaction, which can be considered to be chemical reduction, combines hydrocarbon, $CO_2$, $H_2O$ and heat to product CO and $H_2$. However, numerous other reactions also occur during the reforming process. In particular, when waste streams are steam reformed to generate syngas, a plethora of products apart from the desired hydrocarbons are produced. Sulfur- and halogen-containing products are typically considered contaminants, and can damage the electrochemical catalysts of high temperature fuel cells driven by syngas.

SUMMARY

Efficient use of SR requires optimized process control parameters and recycling of reaction products to maximize production of hydrogen and Fischer Tropsch products (i.e., the various hydrocarbons resulting from combining carbon monoxide and hydrogen in the presence of metal catalysts). These process control parameters include, but are not limited to, controlling SR temperature, addition of steam, CO and optionally, biogas. Optimization of parameters have resulted in increased production of $H_2$, removal of sulfur and halogen contaminants, and control of the $H_2$/CO ratio for efficient generation of Fischer-Tropsch products. Optimization of such parameters have resulted in record $H_2$ production of 50% to 57.3%, removal of sulfur and halogen contaminants, and control of $H_2$/CO ratio for Fischer-Tropsch. Syngas will be typically be about 15% less for MSW/Medwaste because a portion of the feedstock is used to product about 15% by weight biocarbon product. In many waste feedstock cases, the feedstock is already moist (i.e. ~50% moisture) so that steam addition is not needed. An unexpected result was that increasing the SR temperature only 100° F. to 1600° F. achieved maximum of $H_2$ production. For all tested feedstocks, addition of biogas unexpectedly increased $H_2$ production in all cases. Also unexpectedly, for all feedstocks, there was an optimum addition of both steam and $CO_2$ which would provide a range of $H_2$/CO ratio from 2.0 to 3.0, with 2.3 being the optimum for FT.

It will be appreciated that the various systems and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1A:
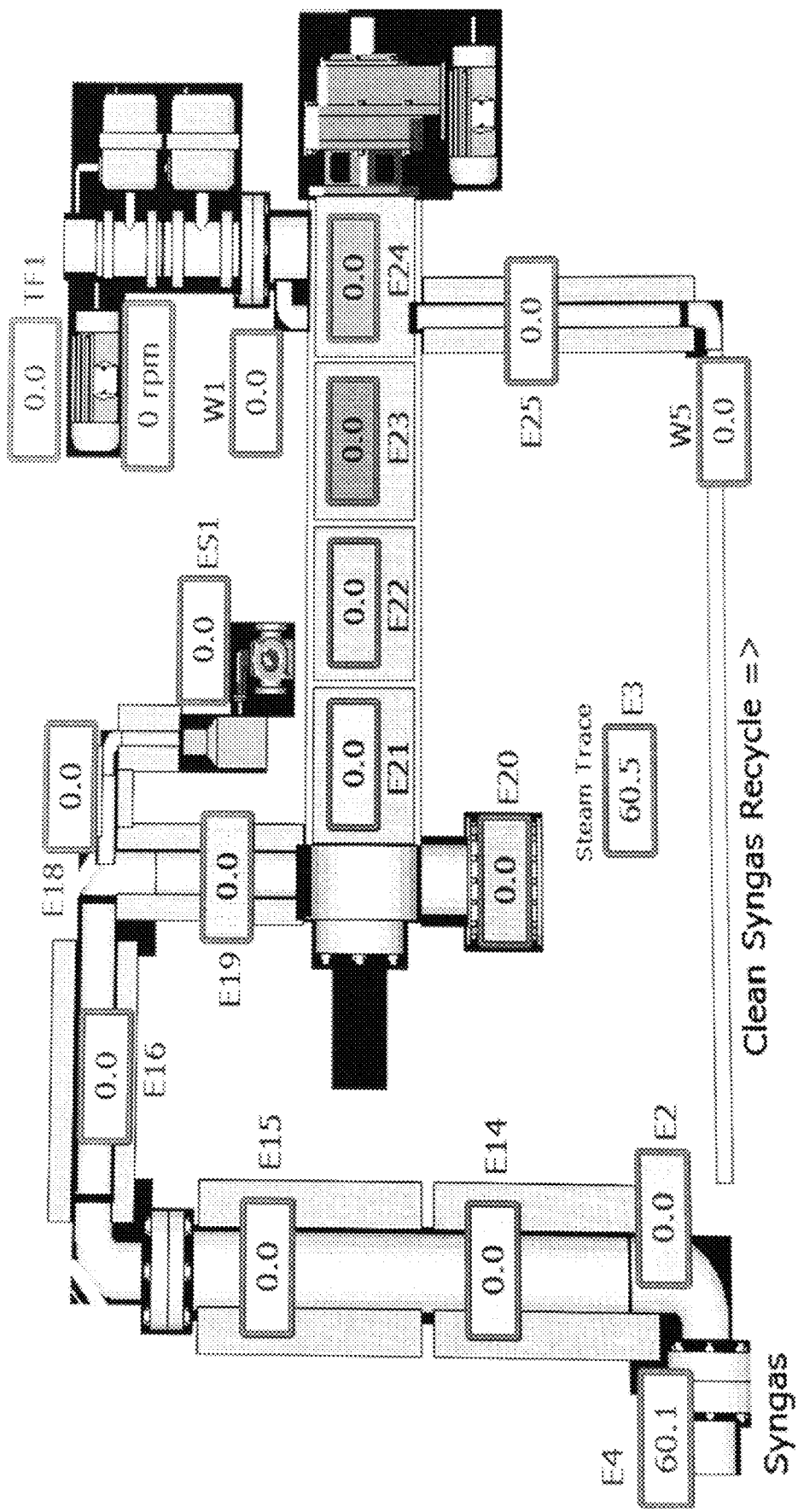
FIG. 1A: schematic representation of a rotary reformer according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention, and further permits the reasonable and logical inference of still other embodiments as would be understood by persons of ordinary skill in the art.

It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims. The usage of words indicating preference, such as "various embodiments" or "preferably," refers to features and aspects that are present in at least one embodiment, but which are optional for some embodiments, it therefore being understood that use of the word "preferably" implies the term "optional."

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise explicitly noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition. The word "about" unless otherwise specified, should be interpreted as referring to a range of values within 10% of the most precise digit in stated value (e.g., "about 1" refers to the range of 0.90 to 1.1; "about 1.1" refers to the range of 1.09 to 1.11).

What will be shown and described herein, along with various embodiments of the present invention, is discussion of one or more tests or simulations that were performed. It is understood that such examples are by way of example only, and are not to be construed as being limitations on any embodiment of the present invention. Further, it is understood that embodiments of the present invention are not necessarily limited to or described by the mathematical analysis presented herein.

Various references may be made to one or more processes, algorithms, operational methods, or logic, accompanied by a diagram showing such organized in a particular sequence. It is understood that the order of such a sequence is by example only, and is not intended to be limiting on any embodiment of the invention.

What will be shown and described herein are one or more functional relationships among variables. Specific nomenclature for the variables may be provided, although some relationships may include variables that will be recognized by persons of ordinary skill in the art for their meaning. For example, "t" could be representative of temperature or time, as would be readily apparent by their usage. However, it is further recognized that such functional relationships can be expressed in a variety of equivalents using standard techniques of mathematical analysis (for instance, the relationship F=ma is equivalent to the relationship F/a=m). Further, in those embodiments in which functional relationships are implemented in an algorithm or computer software, it is understood that an algorithm-implemented variable can correspond to a variable shown herein, with this correspondence including a scaling factor, control system gain, noise filter, or the like.

Various embodiments of the inventions shown herein focus on a process in which process control parameters are used to show record $H_2$ productions, removal of sulfur and halogen contaminants, and control of $H_2/CO$ ratio for Fischer-Tropsch (FT). Reformers shown herein, whether rotary reformer, main reformer, or cyclonic separator, preferably operate at or about one atmosphere pressure in anaerobic conditions.

TABLE 1

| Process Control Knobs - Biomass, MSW/MedWaste, Wellgas | | | | | |
|---|---|---|---|---|---|
| Syngas Flow-rate* | SR Temperature | Steam Addition | $CO_2$ Addition | Biogas Addition | Max $H_2$ Achieved. |
| 7 TPD | 1600° F. | ≤490 lbs/hr | ≤290 lbs/hr | ≤750 lbs/hr | 55% |
| 25 TPD | 1600° F. | ≤1750 | ≤1035 | ≤2700 | 57% |

*syngas will be 15% less for MSW/Medwaste because the process forms 15% by weight biocarbon product.

In many waste feedstock cases, the feedstock is already moist (i.e. ~50% moisture) so hot steam addition is not needed. Increasing the SR only 100° F. to 1600° F. achieved a maximum of $H_2$ production. For all feedstocks, addition of biogas typically increased $H_2$ production. For all feedstocks, there was an optimum addition of both steam and $CO_2$ which would provide a range of $H_2/CO$ ratio from 2.0 to 3.0, with 2.3 being the optimum for FT.

Recent market data show:

| Cost per Mile (relative to Gasoline) | |
|---|---|
| Gasoline | 1.00 |
| Synfuel (C8) | 8.20 |
| Synfuel (C10) | 3.83 |
| Hydrogen | 0.84 |
| Electricity from Grid | 0.69 |

In some embodiments, a $CO_2$ removal bed is added to the system to remove $CO_2$ emissions from the Cat Converter to provide carbon sequestration capacity.

Figure 1B:
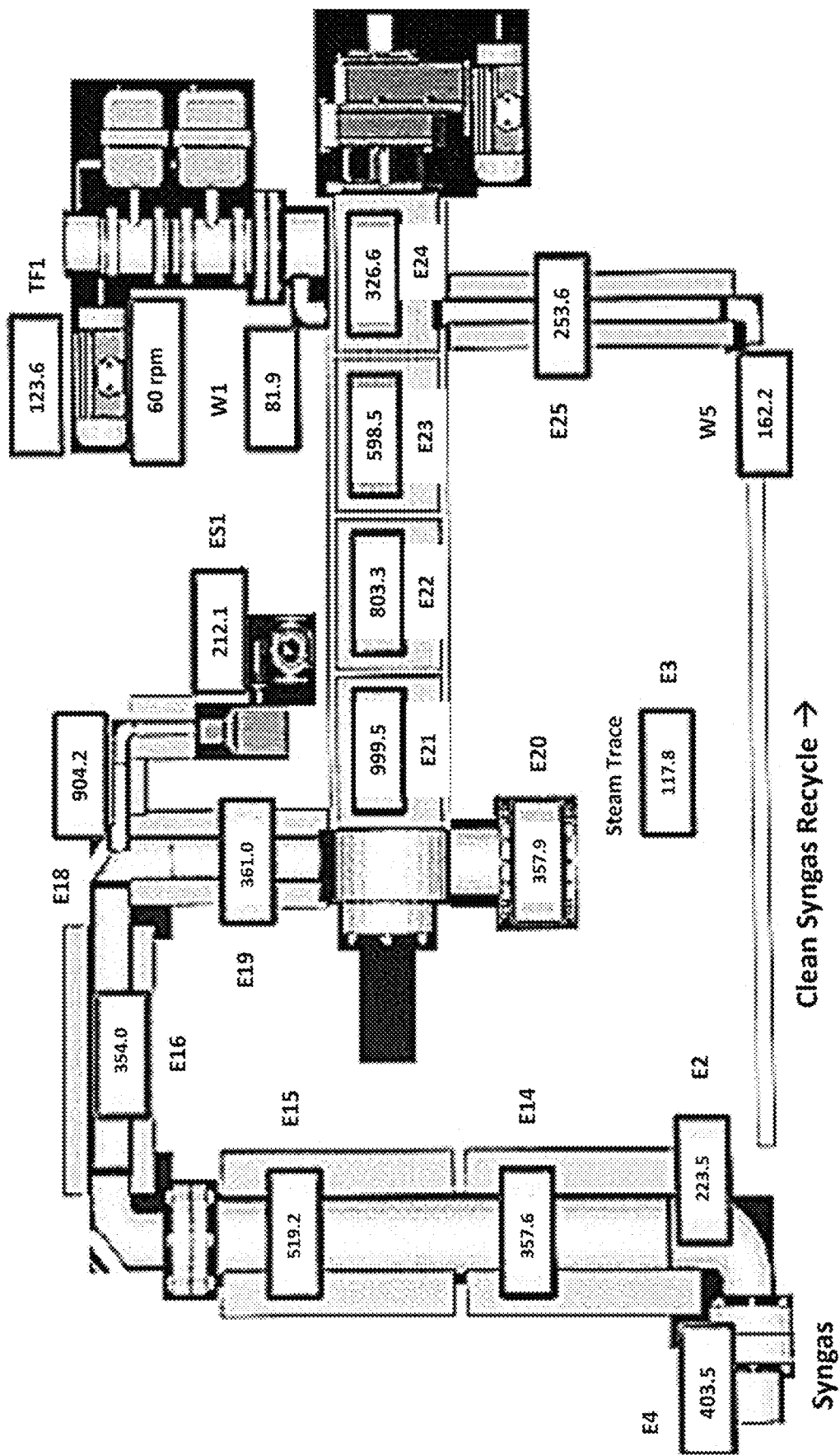
FIG. 1B: rotary reformer temperature distribution for the system of FIG. 1A.

(1) Biomass Feed
Dairy Anaerobic Digestate:

In one embodiment digestate having 24% to 70% moisture content by weight and containing around 700 ppm total S, 4.1% organic $N_2$, 0.13% P, and 0.17% K that was loaded into the hopper at a rate of 5 gallons over 1 hour. The density of the digestate was measured at 0.133 g/cc. It fed very well at the lower moisture levels through both the hopper running at 54 rpm and the double lock hoppers cycling every 2 minutes. The rotary (RR) temperature distribution from lockhopper inlet at the right side of FIGS. 1A and 1B above to the left through the flyover HX simulator that quenches the syngas. The E20 pot into which the residue falls was at 372° F. Varying amounts of steam were added for various runs. These run data are summarized in Table 1 above.

Digestate was used with moisture added to reach 70% water. It fed with some difficulty through the screw-bottom hopper and lockhopper at the lower auger rate of 54 rpm. Lower moisture levels around 50% fed better.

Further runs optimized the RR temperatures of each of the four zones, the steam added, and the syngas quenching temperature. One run used 50° F. higher temperatures than previous and superheated steam at over 900° F.

At the end of the run, after the residue E20 pot has cooled and safe to open in air (the next day), the mass was measured at 1100 gms and is black, low density, free of moisture, and freely flowing small size particle solids. Compared to the 5 volumetric gallons or 3000 gm mass feed on a dry basis, the mass reduction was 63.3%, and the volume reduction was 1.5/5 or 70% reduced. The next optimized run showed an 84% mass reduction and 75% volume reduction.

Figure 2A:
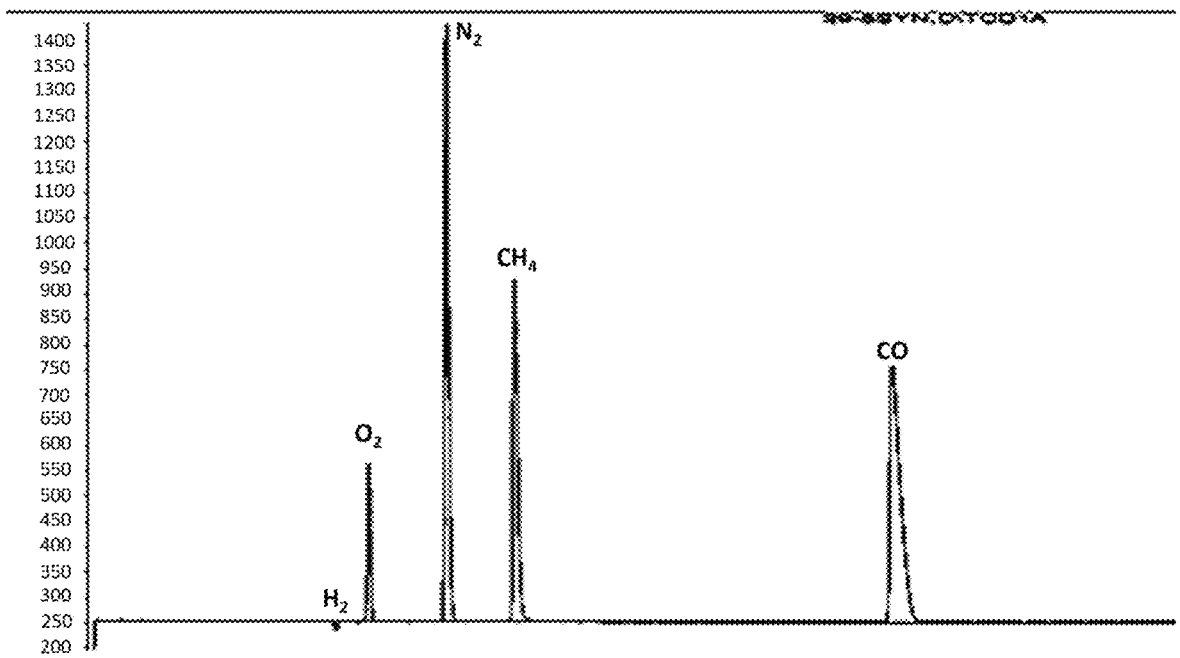
FIG. 2A: syngas GC analysis

The residue ("BioCarbon") analysis for NPK and total carbon is presented in FIG. 2A. The syngas produced was analyzed by ALS/SimiValley to show all light gases from H2 to CH4 and the light hydrocarbons C1 to C6. These results also indicate how much steam can be added in the next run. This will likely range from 25 to 100 cc/min via the rotameter. This is because the digestate feedstock was 15-25% moisture content; much drier than expected. With 55% moisture digestate, no steam should be needed.

The syngas was analyzed by our Mole Sieve GC/TCD to provide the following results in FIG. 2A in left-to-right order: $H_2$, $O_2$, $N_2$, $CH_4$, and CO. FIG. 2A shows the tiny $H_2$ peak of 274 area at left. If all $O_2$ and $N_2$ is removed the $H_2$ would be about 43%, and if air is removed, $H_2$ would be 35% leaving 8% $N_2$ as produced possibly from the reforming chemistry of organic nitrogen. Using the $O_2$ & $N_2$ corrections, (43%/38%) the $H_2$/CO ratio is about 1.13, comparable to the previous run's ratio of 1.23. The reduced air intrusion resulted from longer purging of the sample vessel. Longer purges over 30 sec can be used to reduce the air intrusion even more. This column does not provide $CO_2$ peaks. And it does not show any $N_2O$ at detectible levels.

Figure 2B:
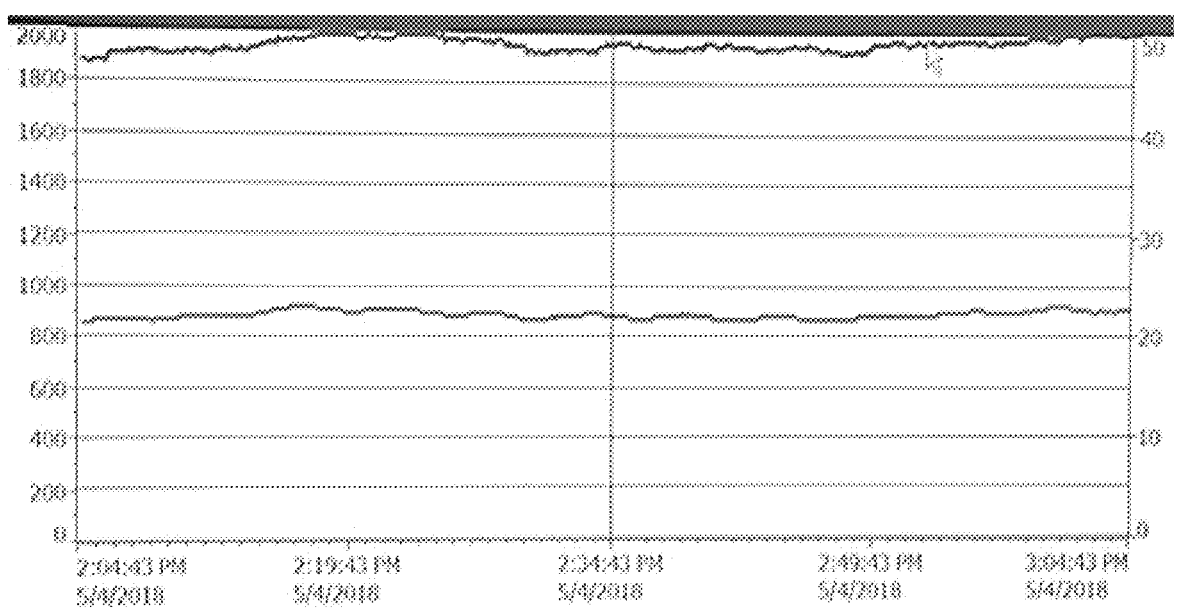
FIG. 2B: hydrogen production at steady 50%

Steady Hydrogen Production:

Shown in FIG. 2B for one run is thermal performance of the rotary reformer plus the oxygen residual (lower line) and the raw $H_2$ sensor readings (upper line). FIG. 2B shows the $H_2$ production at about 50% with some variation from in changes feedrate arising from controls. Increasing the SR from about 1500° F. (1484° F. in FIG. 6) to about 1600° F. increased $H_2$ production from 45% to 57%. The variations proved to provide valuable insight as to the feedhopper operation and were found to be useful as a guide to the feedhopper operation. The feedrate of the run was 50% faster with the lockhopper valves cycling once every 45 seconds.

Syngas was sampled using Tedlar bags, sent to the commercial Lab, ALS/Kelso by FedEx next day, although these plastic bags will lose a little $H_2$ by diffusion, for which corrections must be made. These are the results corrected for oxygen removal, leaving the portion of $N_2$ left is shown as balance remaining, and for $H_2$ loss correction using a $H_2$/CO ratio of 2.00, 2.65 and 3.00. In one sample, the hydrocarbon gases ranged from C2=2.4, C3=0.13, C4=0.043, C5=0.0041, C6=0.0020, C6+=0.011% by volume, consistent with past runs. In another sample, hydrocarbon gases ranged from C2=2.9, C3=0.023, C4=0.018, C5=0.0043, C6=0.0089, C6+=0.057% by volume, consistent with past runs with MSW and Medwaste. It is predicted that the 0.057% C6- is mostly benzene resulting from lower steam.

So, this analysis produces results for $H_2$ at 32.62% and 35.41%. These ALS data show that the production of $N_2$ from the digestate organic nitrogen is large and 60% increased by air leaks as shown by the $O_2$ result.

Figure 3:
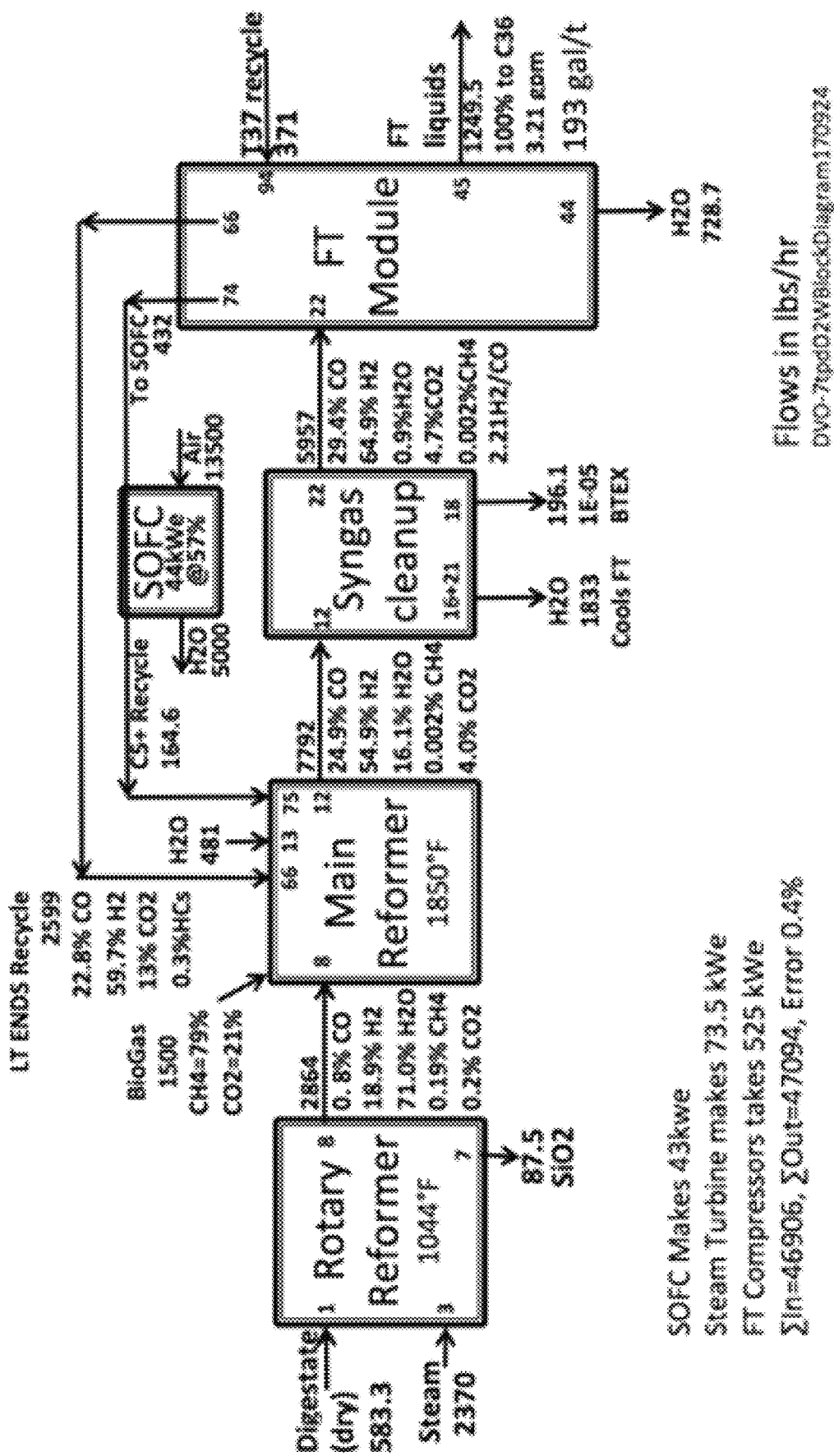
FIG. 3: Wet Dairy Digestate+Biogas Process Flow diagram.

FIG. 3 depicts a process flow diagram for feeding 80% moisture digestate as received (FIG. 3 references the flow rate in lbs/hr in terms of the dry weight of the moist digestate). Then, a full 1500 lbs/hr of biogas was added, the main SR produced 54.9% $H_2$ in good agreement with FIG. 2A. And when the water of condensation was removed the $H_2$ level increased to 64.9% H. The scheme shows the process layout to be feasible as well as for FT. It is helpful to utilize a 525 kWe compressor operating costs because of the much larger flows resulting from the added water. Lower moisture reduces the power demand.

Raw Syngas Sulfur Levels Before Cleanup.

Processing simulated wellhead gas, that is, natural gas originating from a natural gas well, with very little sulfur only produced 71 ppb COS, 12 ppb of $CS_2$ and 130 ppb of thiophene. Wellhead gas was simulated using PG&E pipeline natural gas. Cleanup involved the use of a hot ZnO bed.

In Table 2 below are shown the range of sulfur compounds found by ALS Lab in our 8/7 digestate syngas. These results are consistent with syngas sulfur compounds seen in earlier tests done on similar biomass.

TABLE 2

SULFUR RESULTS - BASE CASE

| CAS# | Compound | Result µg/m³ | MRL µg/m³ | Result ppbV | MRL ppbV |
|---|---|---|---|---|---|
| 7783-06-4 | Hydrogen Sulfide | 58,000 | 70 | 41,000 | 50 |
| 463-58-1 | Carbonyl Sulfide | 150,000 | 120 | 62,000 | 50 |
| 74-93-1 | Methyl Mercaptan | 33,000 | 98 | 17,000 | 50 |
| 75-08-1 | Ethyl Mercaptan | 300 | 130 | 120 | 50 |
| 75-18-3 | Dimethyl Sulfide | 19,000 | 130 | 7,300 | 50 |
| 75-15-0 | Carbon Disulfide | 18,000 | 78 | 5,800 | 25 |
| 75-33-2 | Isopropyl Mercaptan | ND | 160 | ND | 50 |
| 75-66-1 | tert-Butyl Mercaptan | ND | 180 | ND | 50 |
| 107-03-9 | n-Propyl Mercaptan | 650 | 160 | 210 | 50 |
| 624-89-5 | Ethyl Methyl Sulfide | 700 | 160 | 230 | 50 |

TABLE 2-continued

SULFUR RESULTS - BASE CASE

| CAS# | Compound | Result µg/m³ | MRL µg/m³ | Result ppbV | MRL ppbV |
|---|---|---|---|---|---|
| 110-02-1 | Thiophene | 35,000 | 170 | 10,000 | 50 |
| 513-44-0 | Isobutyl Mercaptan | ND | 180 | ND | 50 |
| 352-93-2 | Diethyl Sulfide | ND | 180 | ND | 50 |
| 109-79-5 | n-Butyl Mercaptan | 430 | 180 | 120 | 50 |
| 624-92-0 | Dimethyl Disulfide | 41,000 | 96 | 11,000 | 25 |
| 616-44-4 | 3-Methylthiophene | 1,600 | 200 | 410 | 50 |
| 110-01-0 | Tetrahydrothiophene | 880 | 180 | 240 | 50 |
| 638-02-8 | 2,5-Dimethylthiophene | 330 | 230 | 73 | 50 |
| 872-55-9 | 2-Ethylthiophene | 260 | 230 | 57 | 50 |
| 110-81-6 | Diethyl Disulfide | ND | 120 | ND | 25 |

ND = Compound was analyzed for, but not detected above the laboratory reporting limit
MRL = Method Reporting Limit - The minimum quantity of a target analyte that can be confidently determined These results are lower than those observed in the Sasol Lurgi coal gasifier: $H_2S$=15,300,000 ppb, Mercaptans=600,000 ppb, COS=180,000 ppb, CS=100,000 ppb, & thiophene=5,000 ppb.

Figure 4:
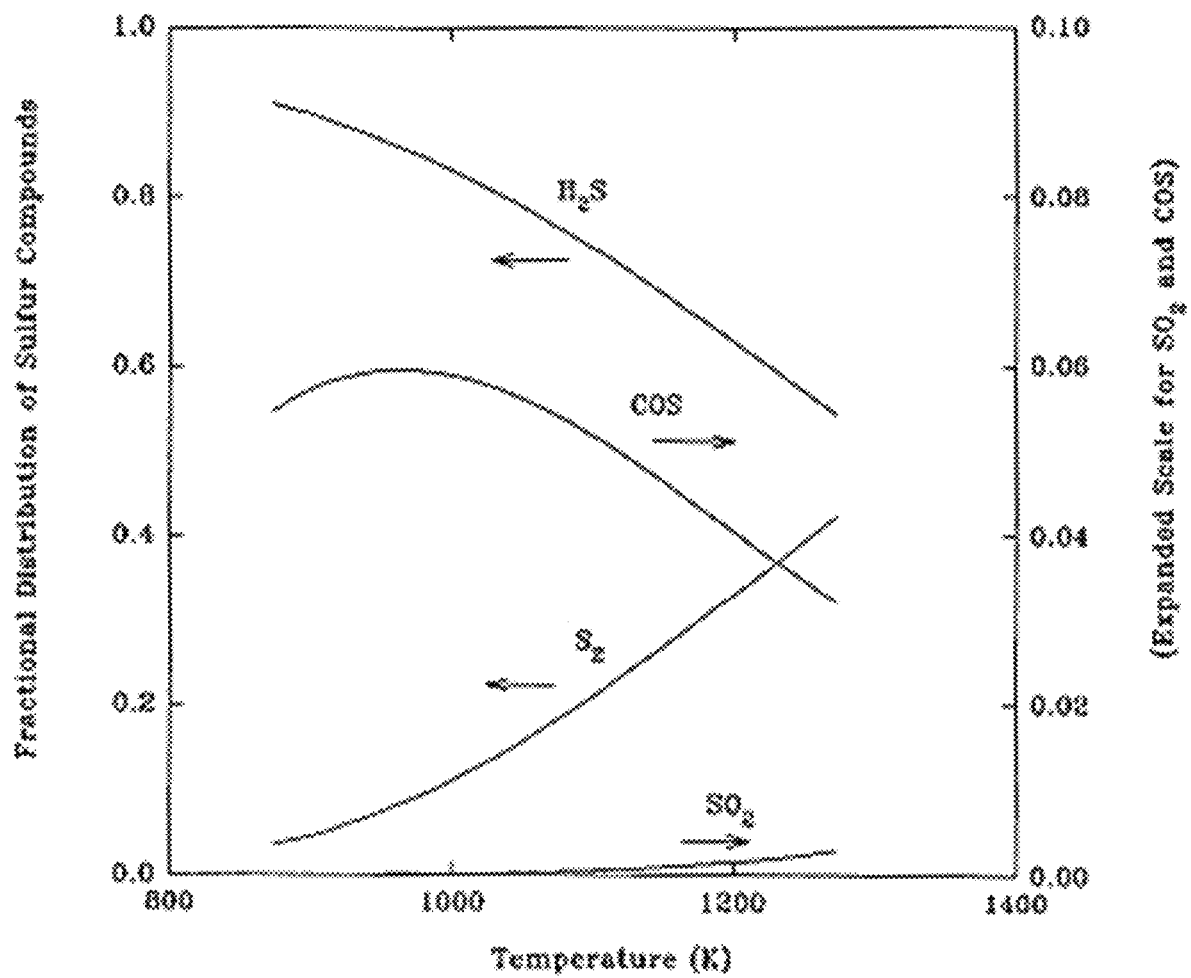
FIG. 4: lime reduction of $H_2S$, COS, and $CS_2$ using 50:50 fraction.

The empirical formula for dairy digestate is $C_{3.414}H_{4.938}O_{1.858}N_{0.100}S_{0.022}$ As can be seen in FIG. 4, 98% sulfur removal is expected with a bed residence time of 10 minutes at 700° C. Lime (e.g., $CaCO_3$) addition to react with the 700 ppm S in the digestate is expected to be around 3.5% (~75 gms) of the feedrate. So, combined with lime removal in the rotary reformer of 90%, 99% overall sulfur removal is expected. One test was with 5 lbs. of lime pellets added.

The next step was to determine how many if not all of these compounds are removed by lime addition to the rotary reformer. First results are shown in Table 4. The number of non-detectables (ND) are greatly increased, which means that lime had a general reduction effect on the low concentration species. Major sulfur species greatly reduced were:

TABLE 4

Reduction of Sulfur Chemicals Upon Addition of Lime to Rotary Reformer

Methyl Mercaptan (93% reduction)
Dimethyl Sulfide (97% reduction)
n-PropylMercaptan (79% reduction)
Ethyl Methyl Sulfide (98% reduction)
Dimethyl sulfide (99.76% reduction)
3-methylthiophene (97% reduction)
tetrahydrothiophene (77% reduction)

Major species not significantly reduced were hydrogen sulfide, carbonyl sulfide, and carbon disulfide. These results were conducted in the rotary reformer at 1000° F. (810° K) in its fourth stage. It is predicted that higher temperature would improve lime removal of sulfur compounds. Also further sulfur reductions were achieved by addition of a 700° F. ZnO packed bed for lowering $H_2S$, COS and $CS_2$.

Process Simulation for MSW & Medwaste

Figure 5A:
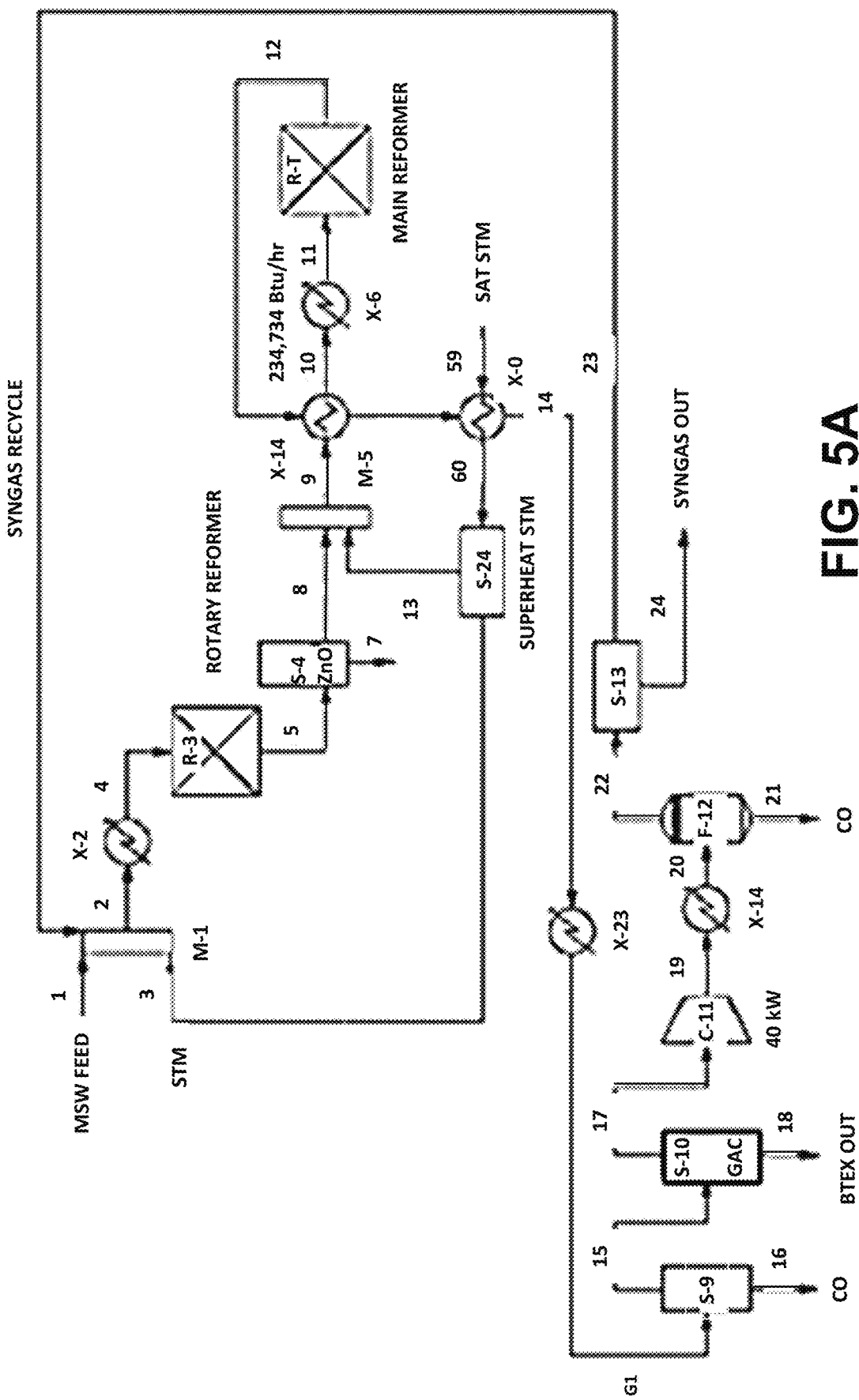
FIG. 5A: scaled up 7 tons/day municipal solid waste (MSW)/medical waste (MedWaste) Plant FIG. 5B Second Portion of the Plant FIG. 5C graph depicting $H_2$ percentage as a function of SR temperature

In preparation for running the 1/10th scale pilot unit on MSW, a D2W process simulation was completed to provide estimates of the key process streams and operating conditions (see FIG. 5A).

The feedstock to be shredded to minus ¼" size and fed at 8.33 lb/hr. The feedstock contains moisture level of 2.38 pounds per hour of water, 17% inorganics such as glass and metal, 2% PVC plastic containing chlorine and 8.1% ammonia with the main SR reactor, R-7, to be run at 1500° F. The recycle flow is to be 27.4 pounds per hour. According to the D2W simulation, the main reactor will produce 25.7% carbon monoxide, 54.4% hydrogen, 11.3% water, 1.34% $CH_4$, 6.87% $CO_2$, 0.32% $NH_3$, and 0.075% HCl. At 1500° F. and 1600° F.; the maximum H2 observed=64%; however, the most recent runs after 44-2 were run at 50% $H_2$.

The $H_2$/CO ratio for FT averaged over the last four GC tests was 2.11±0.5. The water condensate would contain 3.1% $NH_3$ and 0.725% HCl; so is nearly neutralized. The main reactor endothermic heat required for the chemistry would be 4.3 kW or about 52% of reactor capacity and the rotary reformer requires 8.75 kW but 23.6 kW was recoverable in the four heat recovery heat exchangers. Also, if there is a SOFC added, its heat can provide up to 79 kWt. The recycle blower only requires 0.6 kWe. So, the steam reforming front end of the overall process balances with only the 4.3 kW needed for the main reactor and 0.6 kW for the blower.

Figure 5B:
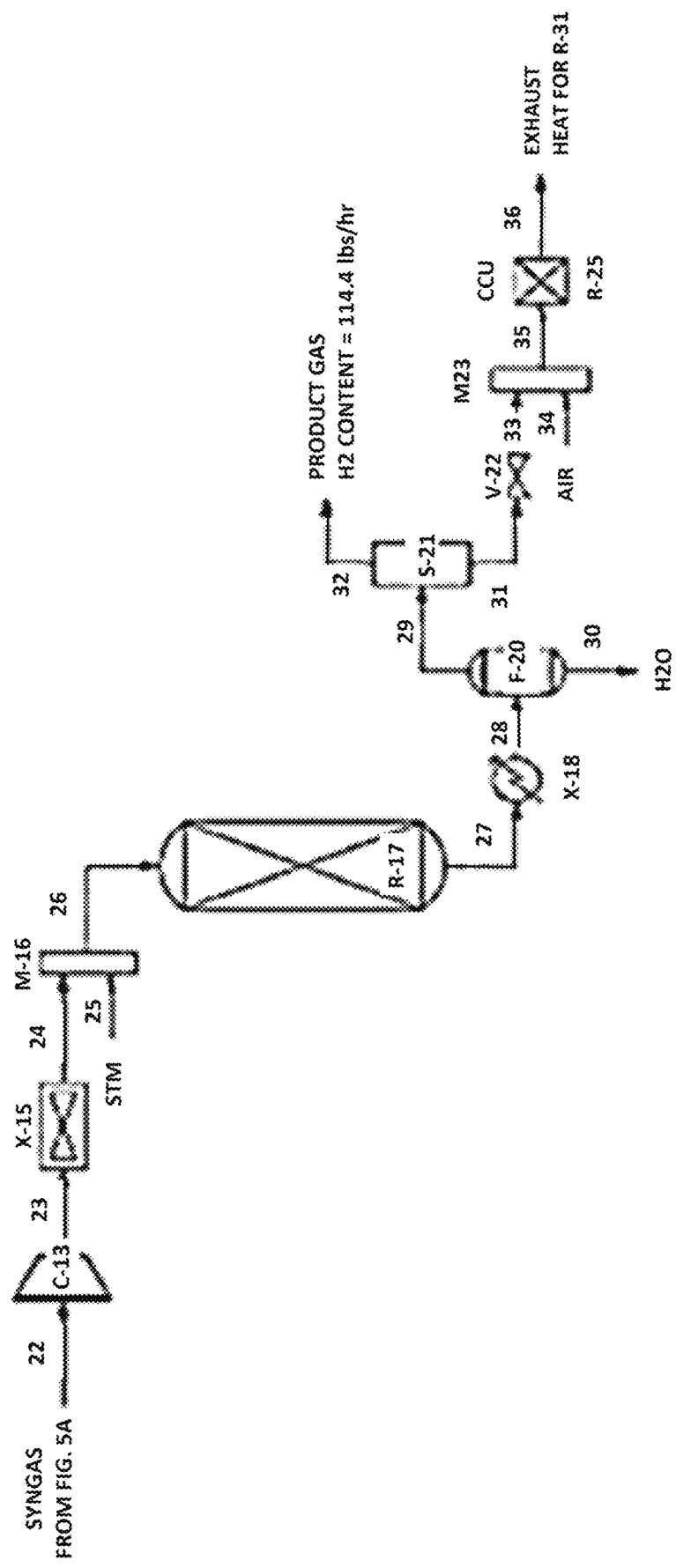

In FIG. 5B is shown the second portion of the plant making only $H_2$. Key to this process configuration is the operation of the PSA, S-21, followed by the WGS unit, R-17. The PSA can tolerate 5% CO, so the amount of steam added to the WGS unit must be high enough to drop the CO below 5%. The PSA typically can achieve 85% $H_2$ recovery. The PSA tail gas is high enough in $H_2$ and CO to get high level performance or the tail gas can be used for making heat in the CCU, R-25.

Figure 6:
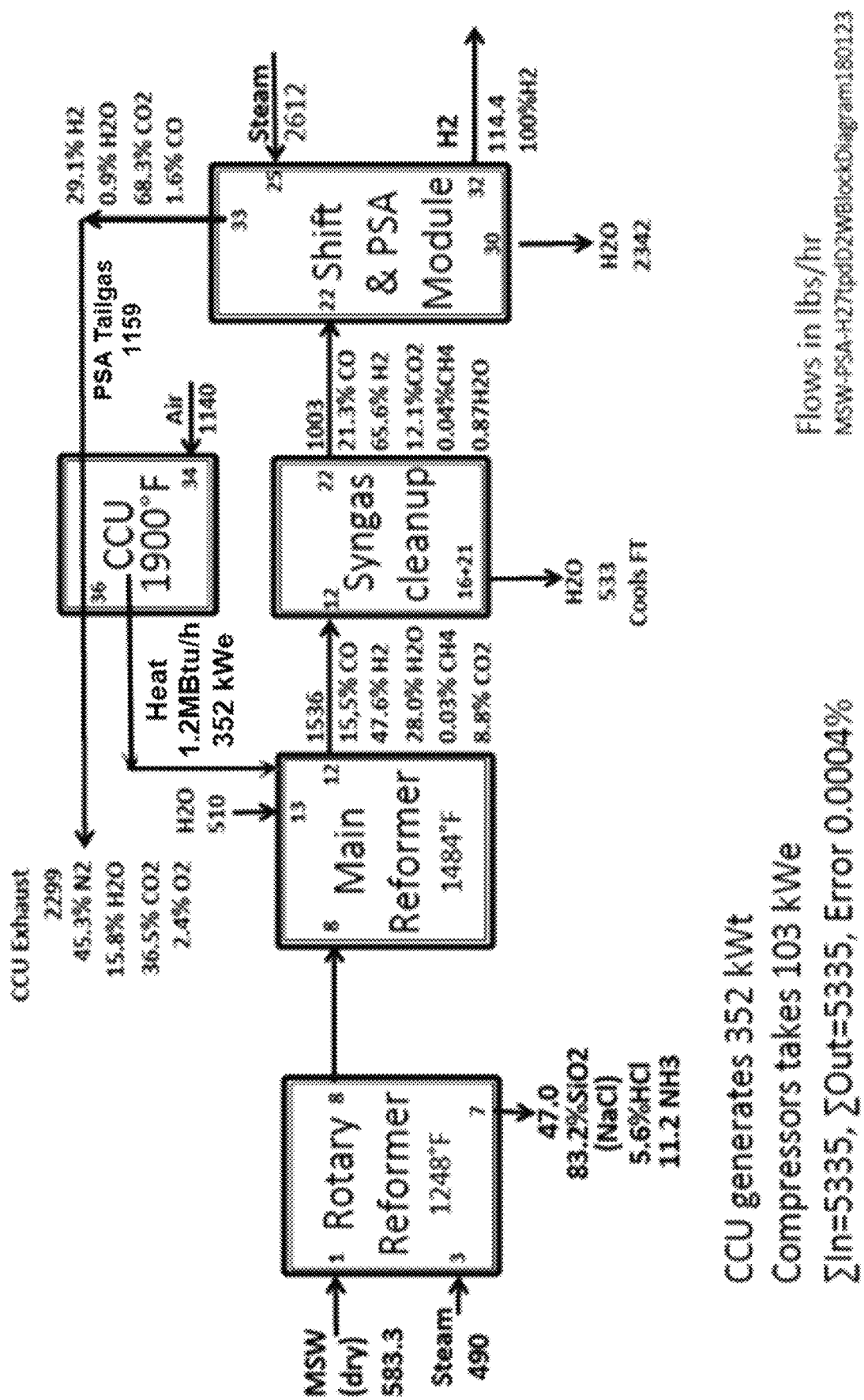
FIG. 6: flow diagram for msw with cat converter heat recovery.

FIG. 6 shows the details of how all of these process blocks fit together to serve the needs of the PSA for purifying the H2 as well as the large heat recovered using the PSA tail gas in the catalytic converter.

At commercial scale, e.g., 7 tons per day (tpd), the MSW feedstock is to be shredded to less than 2" size and fed at 583 lb/hr. The feedstock would typically contain a moisture level of about 2.38 pounds per hour of water, 17% inorganics such as glass and metal, 2% PVC plastic containing chlorine and 8.1% ammonia and main reactor to be run at about 1500° F. (1484° F. in FIG. 6). The recycle flow is 1165 pounds per hour. At commercial scale, all of the flow stream compositions would be similar as discussed above. The main reactor endothermic heat required for the chemistry was 300 kW maximum that is about 52% of reactor capacity and the rotary reformer required 300 kW but 634 kW was recoverable in the four heat recovery heat exchangers. The recycle blower only required 40 kW. The overall steam reformer front end commercial process only needs 300 kW to operate. This energy would be supplied by the highly exothermic FT or PSA making $H_2$.

These process simulation results confirmed results of another project for demonstrating on this very same equipment reformation of medical waste that contained plastic, organics, paper, etc. in hand-cut size (not shredded). That project did produce the 55% hydrogen level that is nearly identical to the present process simulation. In some embodiments this process as described above can be scaled up to 7 tons/day for processing garbage that will be shredded and automatically sorted by infrared to retrieve valuable numbered plastics.

Figure 7:
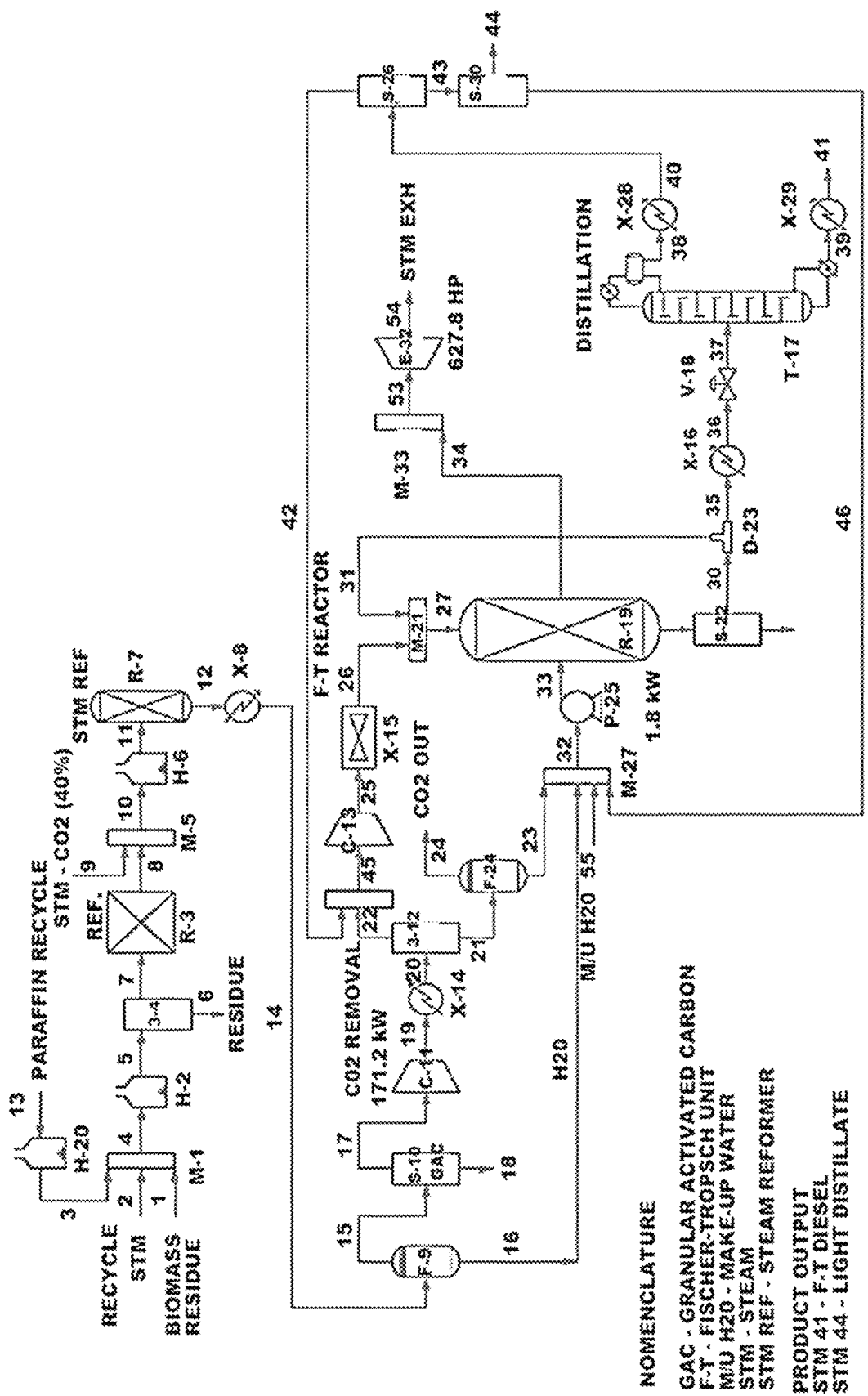
FIG. 7: Scaled Up 7 tons/day MSW/MedWaste Plant
Figure 8:
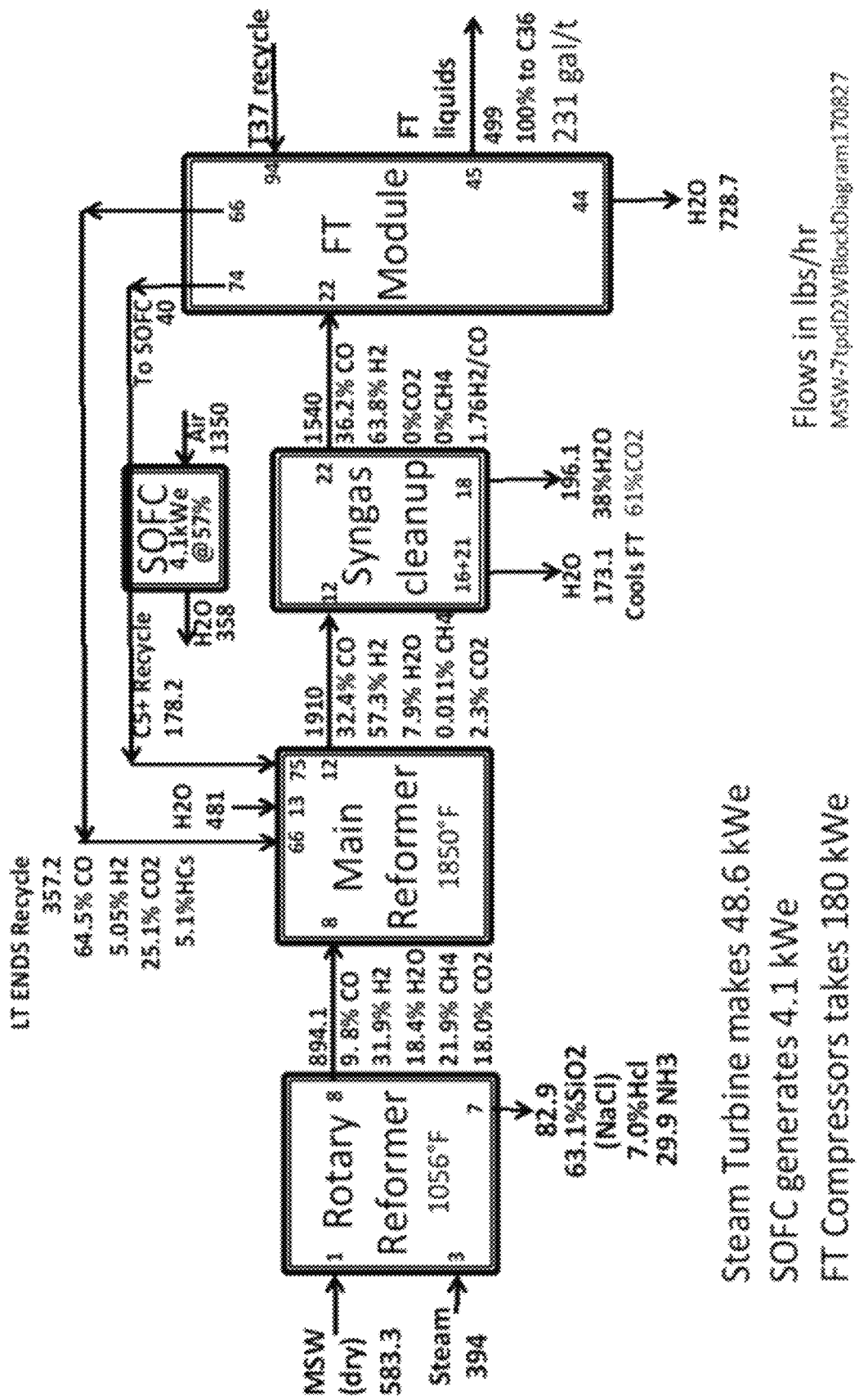
FIG. 8: flow diagram for 7 tons/day MSW to FT liquids with SOFC fuel cell heat recovery.

The diagram in FIG. 8 simplifies the detailed flow diagram in FIG. 7 showing there is produced FT liquids at a rate 231.4 gal/dry ton of MSW feed. The MSW is shown as the dry basis plus any water that is present in the analysis of the MSW which has a substantial water content, like 40%, as shown with water content as steam of 394 lbs/hr. Out of the bottom of the rotary reformer come the inorganic solids such as glass and soil (as $SiO_2$), metal, chlorine as HCl and ammonia equivalent. The syngas leaves the rotary reformer operating at 1056° F. as 894.1 lbs/hr of syngas as stream 8 and serves as feed to the main reformer operating at 1850° F. Also, added to the main reformer are the light ends from the FT module as a recycle stream and also the C5+ recycle components as well as superheated steam at 481 lbs/hr. This steam is internally generated since the whole flow diagram process has an excess of water around 777 lbs/hr or 1.55 gpm. The solid oxide fuel cell (SOFC) accepts CO whereas the common PEM fuels cells do not since the CO is a poison to its catalyst. The SOFC makes excellent quality water electrochemically that is very similar to distilled water.

As shown in the "Syngas Cleanup" module of FIG. 8, the water is condensed, and a portion used to cool the highly exothermic FT Module. So the final cleaned syngas is rich in $H_2$ (63.8%) and in CO (36.2%) but low in $CH_4$ and $CO_2$ that are functional, though not ideal, for use in FT synthesis chemistry. The $H_2/CO$ ratio is 1.76, which is a little lower than the preferred ratio of 2.16.

The FT module involves the FT synthesis of the FT liquids products, including naphtha, jet-A, diesel and some paraffin wax. Naphtha and wax (if produced) also can be recycled as shown back to the main reformer for reuse in the process. Also, any overhead gases (i.e. a small 138 lbs/hr) from 37 tray distillation tower, T-37, to separate the products, are used as well as a feed stream to the FT module. The yield is 231 gal/dry ton of feed, as compared to the FT process simulations done before that make about 125 gal/dry ton. It is helpful to be able to make good use of the two recycle streams.

The powerful advantage is that these two process configurations can be combined so that a mix of $H_2$ and FT liquids can be made the relative portions changed to suit the marketplace. And the economics for such a 7 tpd plant has a superb payback of 9 years selling renewable H2 at $10/kg, saving the current tipping fee of $100/ton, and FT liquids at below market prices.

Wellhead Gas—Hydrogen Production

A cyclonic separator is used to separate natural gas liquids (NGLs) that pose a safety problem in the industry, particularly with the risk of explosion or fire from rail tank cars containing pressurized NGL. The lower SR temperature is also an economic advantage since exotic alloys are not required.

Hydrogen/Carbon Monoxide Ratio

Two reactions in the rotary reformer followed by the high temperature steam reformer dominating the control of the H2/CO ratio are:

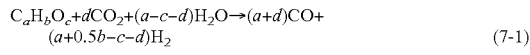

elect heat

The first reaction (7-1), Steam/$CO_2$ Reforming is driven to the right by heat and the second (7-2), the Water-Gas Shift or "WGS" reaction, is an equilibrium reaction that goes only partially to the right, expressed by the WGS equilibrium extent, E. The formula for dairy digestate is $C_{3.414}H_{4.938}O_{1.858}N_{0.100}S_{0.022}$. The empirical formula is normalized to C1, i.e., a=1. Combining these, the overall reaction is:

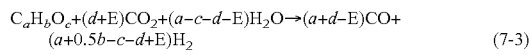

And the $H_2/CO$ ratio is:

$$H_2/CO=(a+0.5b-c-d+E)/(a+d-E) \quad (7\text{-}4)$$

The chemical analysis of the organic biomass/waste feedstock is done by the inexpensive and routine Ultimate and Proximate Analysis method, the empirical formula for feed $C_aH_bO_c$.

Figure 9:
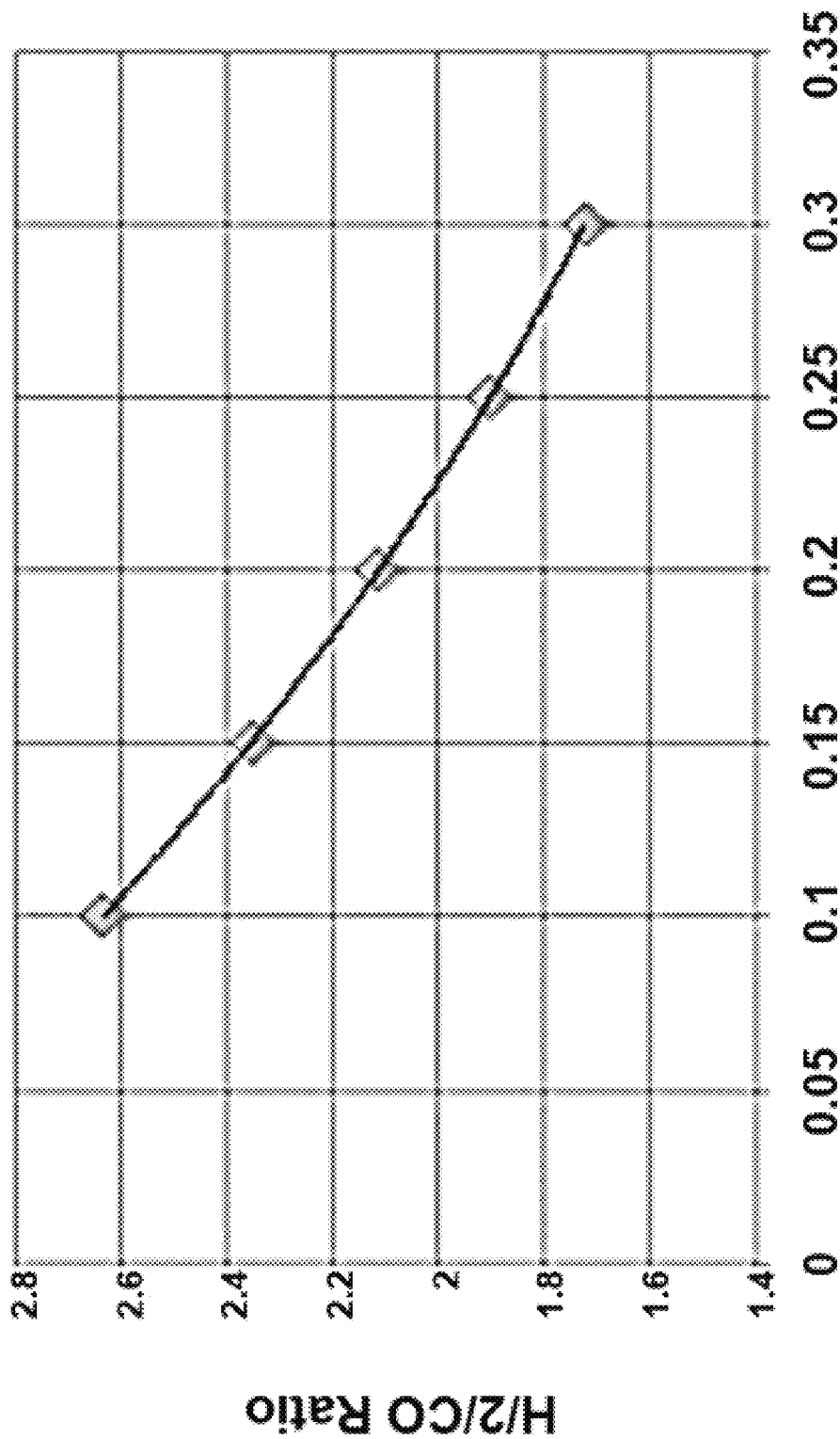
FIG. 9: $H_2$/CO and $CO_2$ added

FIG. 9 shows the molecular subscripts, a, b, and c. The process variables that are selected for the processing recipe are the amount of $CO_2$ recycle, d, and the temperature of the high temperature reformer, that sets E≈0.5. So it can be seen that the $H_2/CO$ ratio is adjusted by adjusting the $CO_2$ addition. For example, FT commonly uses $H_2/CO$=2.16, but other ratios change the FT liquid split between diesel, jet fuel, naphtha, etc.

Figure 10:
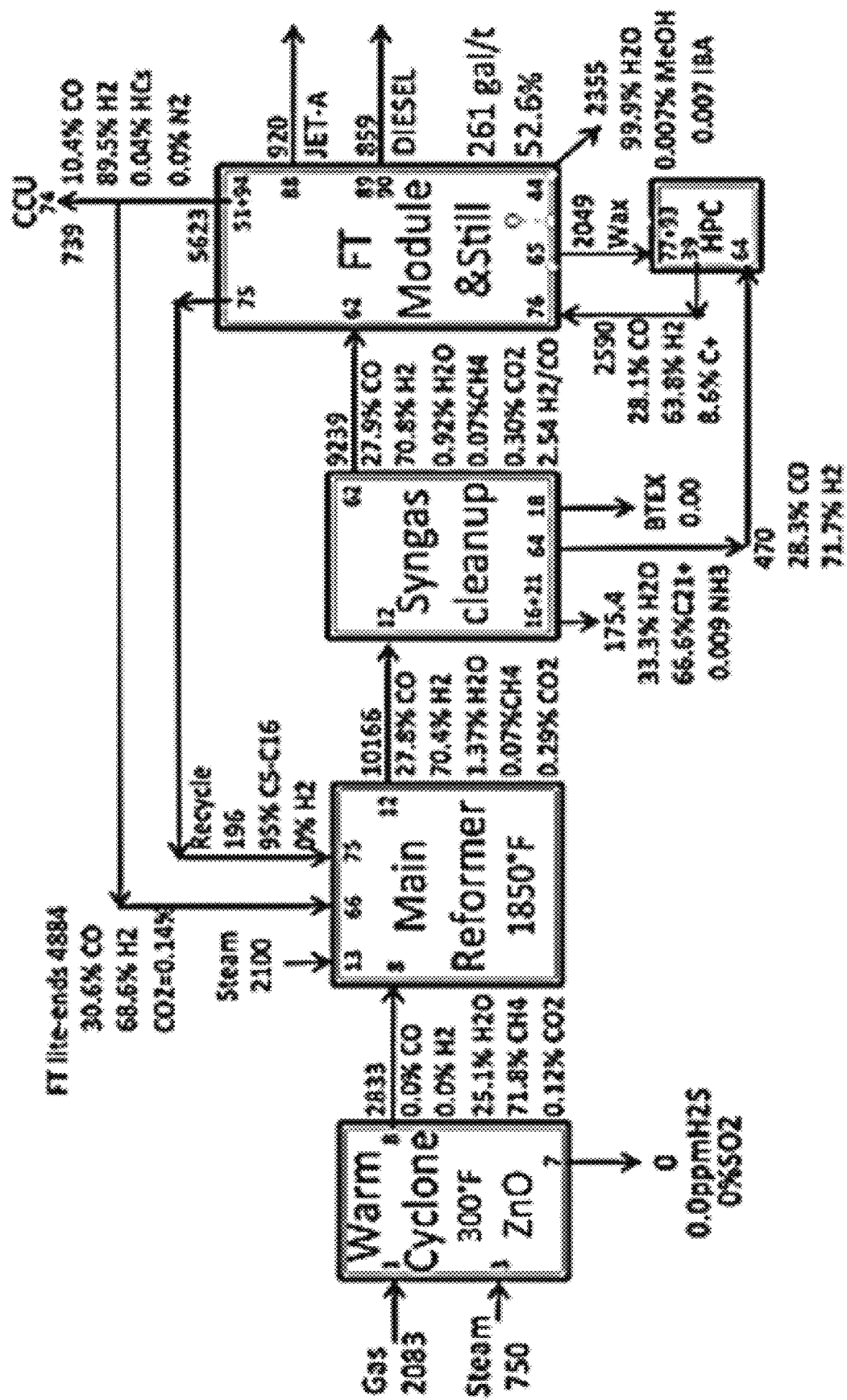
FIG. 10: D2W© simulation process

Process Simulation:

Based upon a WinSim D2W© simulation process and the gas analysis of QEP/Pinedale Natural Gas sample (91.6% $CH_4$, 5.3% $C_2H_6$, 1.49% $C_3H_8$, 0.35% $C_4H_{10}$, the balance $C_5$-$C_9$ paraffins and 0.43% $CO_2$): FIG. 10 shows 155 bbl/d and 261 gal/t of feed FT liquids (GTL-PinedaleBlockDiagram171112).

1/10th Scale Well Gas to Diesel and Jet A Conversion 1. 1,100 MCF/day natural gas converts to 5,400 gallons of fuel (Diesel #2 or Jet A) (i.e. 4.93 gal/MCF or about 217 gallons per dry ton).
2. Nearly Energy neutral: 1,135 kWe consumed while 948 kWe is produced through steam turbine.
3. Mass efficient: 2,083 lbs. of mass gas enters and 1,516 lbs. of FT product out (i.e. 73% efficiency) with carbon efficiency (feed carbon-in vs. product carbon-out) of 52.6%.

Figure 11A:
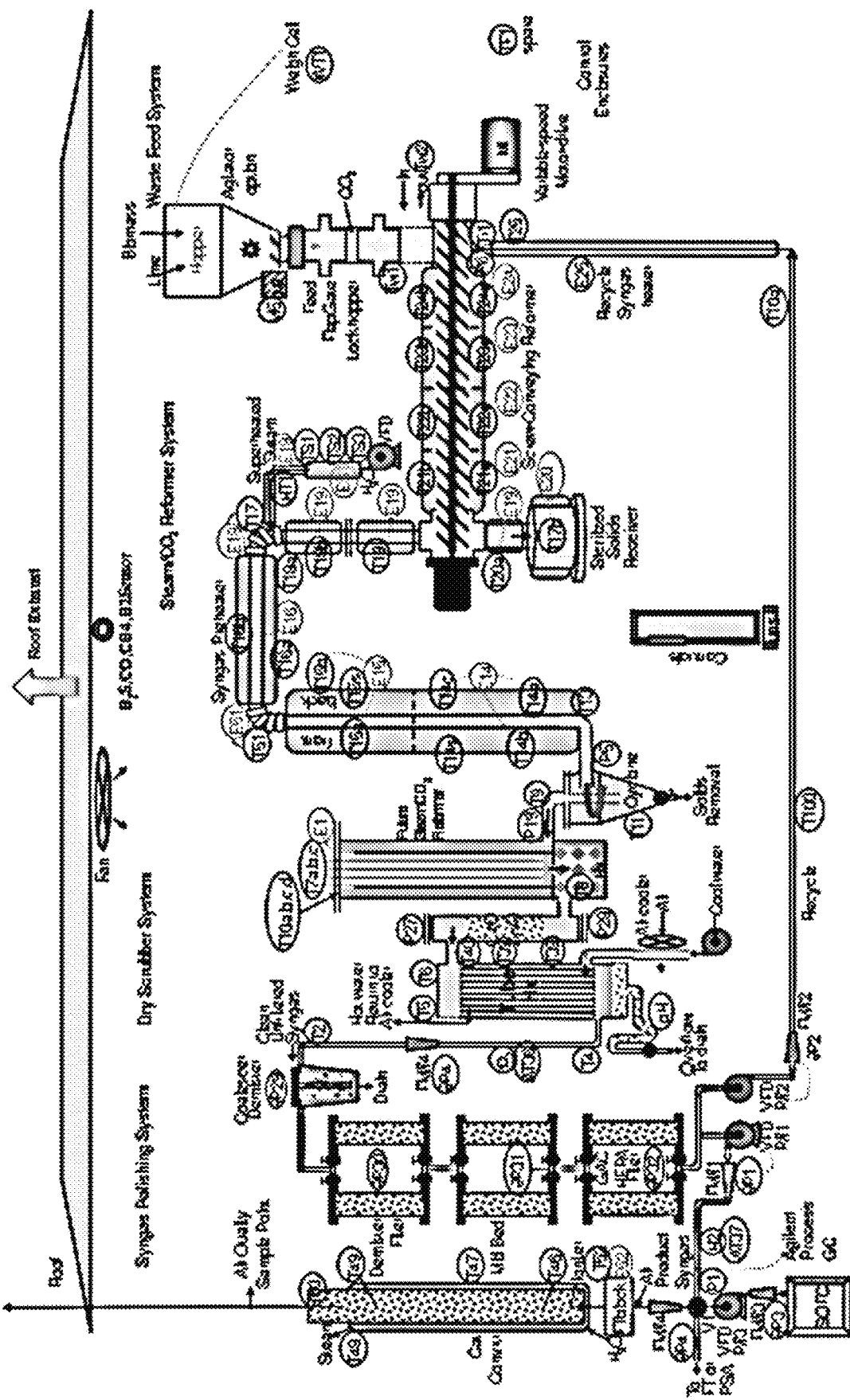
FIG. 11A: schematic representation of a 1/10th scale demonstrator according to another embodiment of the present invention.
Figure 11B:
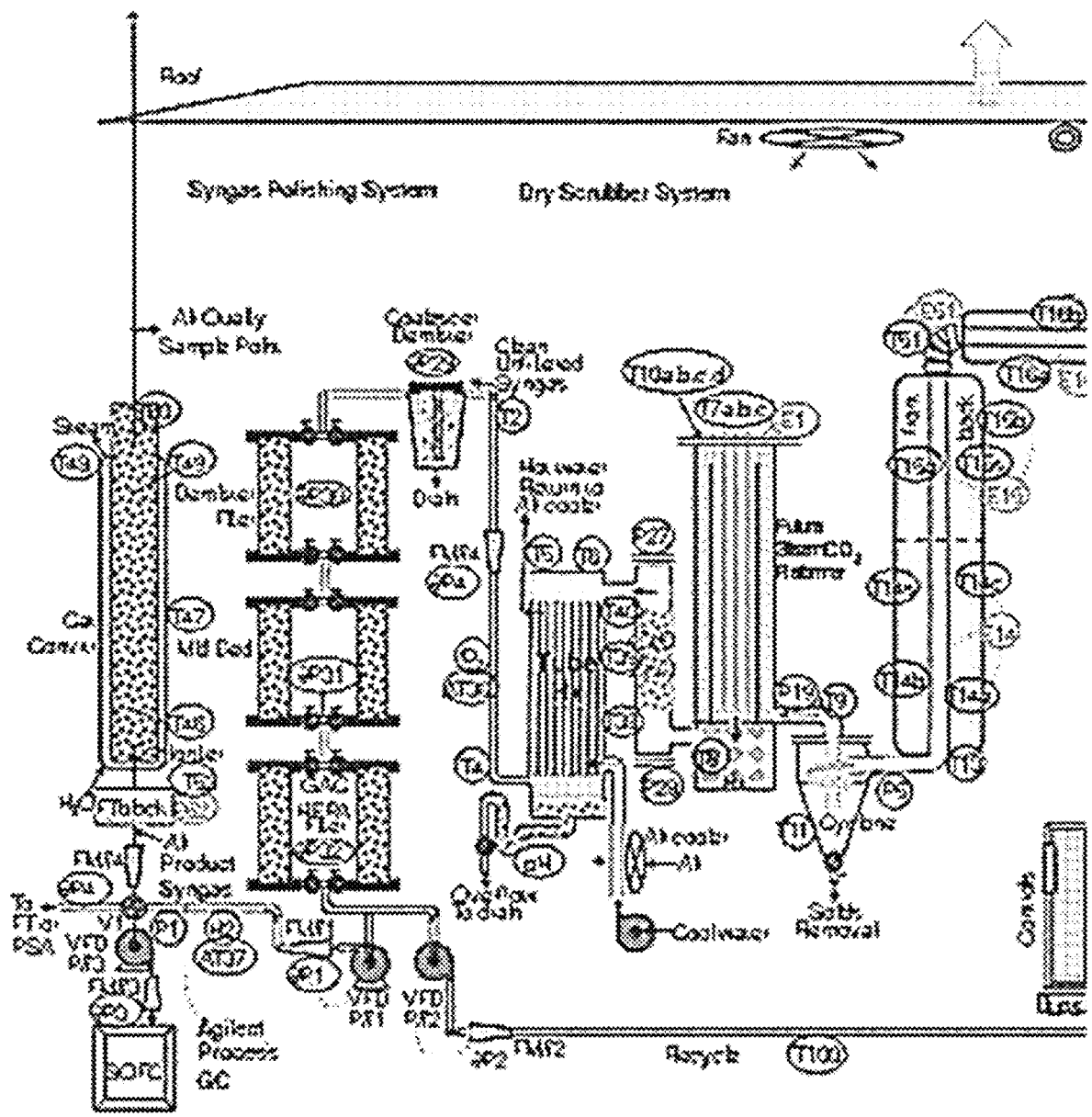
FIG. 11B is an enlargement of the left hand portion of FIG. 11A.
Figure 11C:
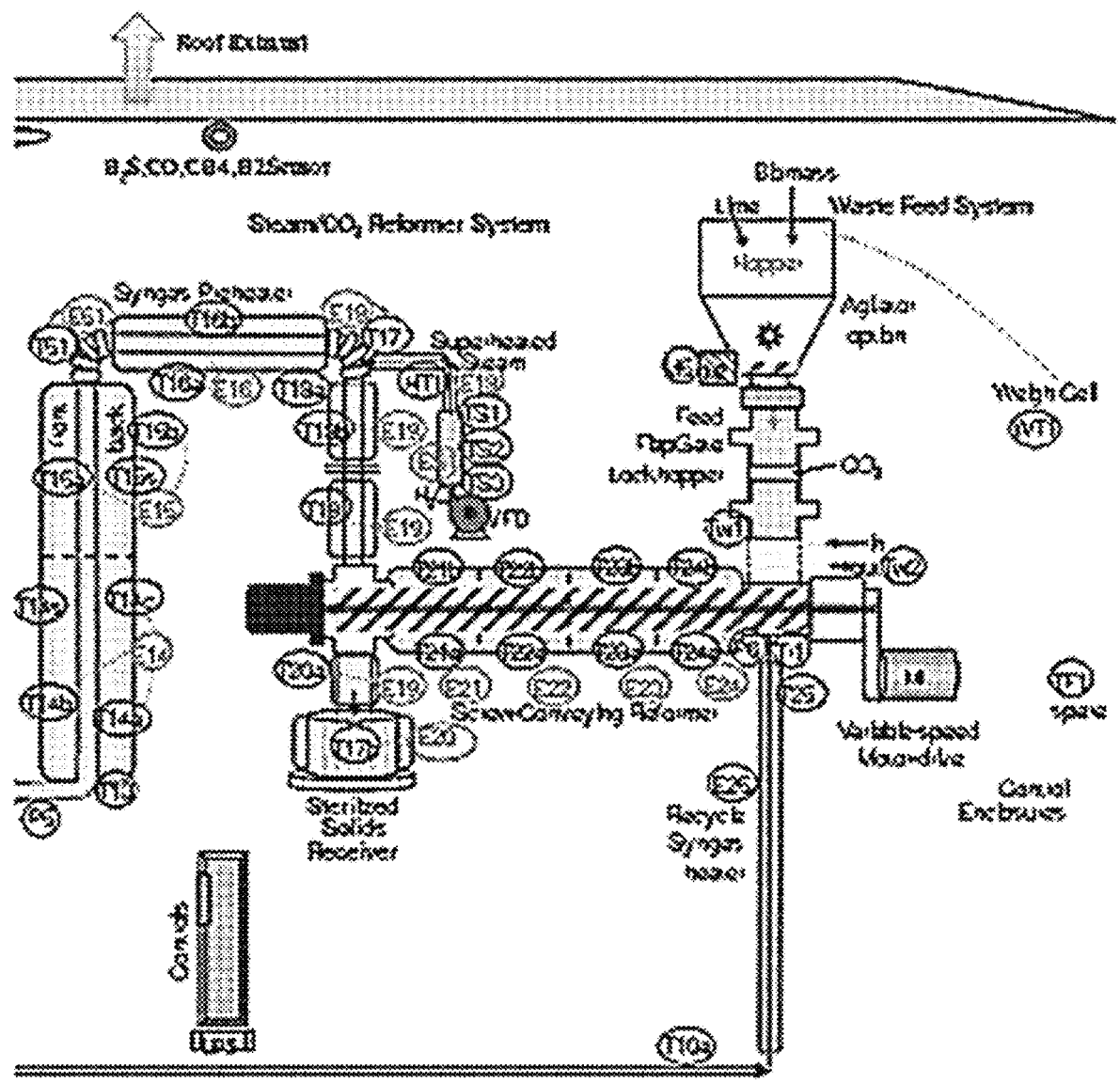
FIG. 11C is an enlargement of the right hand portion of FIG. 11A.

The first phase of this gas well project uses only the left portion of the 1/10th engineering demonstrator (FIG. 11A; FIGS. 11B and 11C are enlargements of the left and right sides of FIG. 11A, respectively) and begins at the hot cyclone phase where the simulated feedstock from the gas well starts at just left of center in FIG. 11A below.

The flow in phase one begins at the cyclone separator (shown left of center) with input gases of $CO_2$, superheated steam and natural gas (94% methane and 6% ethane) and moves right to left. This flow is oxygen-free. Just left of the cyclone, the large steam/$CO_2$ reformer reactor runs at high temperature of 1,200-1,800° F. to convert the mixture of feed gases into high quality syngas. The syngas product with a $H_2/CO$ ratio of about 2.1 is fed to the Fischer-Tropsch. It is unusual to accomplish conversion of wellhead gas to FT products without the use of auto thermal gasifiers using a catalyst. The disclosed invention avoids the use of a catalyst because of the catalyst poisons inherent in the well gas involving a complex variety of sulfur compounds, such as $H_2S$, $CS_2$, COS, thiophenes, etc. In the disclosed invention, these sulfur contaminants are converted to $H_2S$ and dry-scrubbed out by means of the next unit just left of the Steam/$CO_2$ reforming reactor, involving sulfur getters, such as ZnO and CuO. To the left of that dry scrubber, there is an air-cooled water heat exchanger condenser that quenches this syngas to preserve the conversion. And finally the syngas is filtered and cleaned before it moves to the FT synthesis system (that also can involve a small solid oxide fuel cell (SOFC) to make electricity used to provide some power to the plant).

Figure 12A:
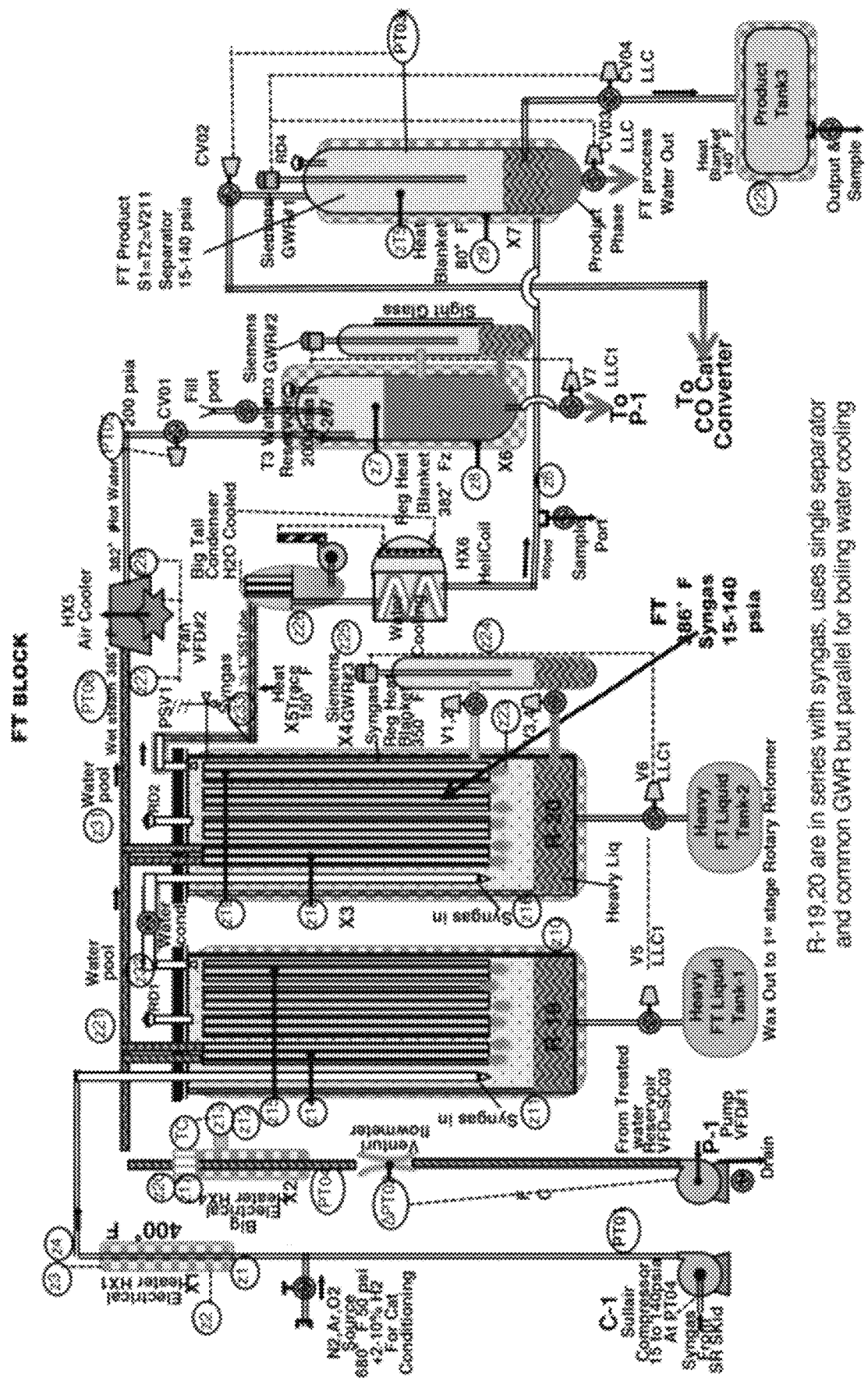
FIG. 12A: 1/10th scale demonstrator—Fischer-Tropsch section according to another embodiment of the present invention.
Figure 12B:
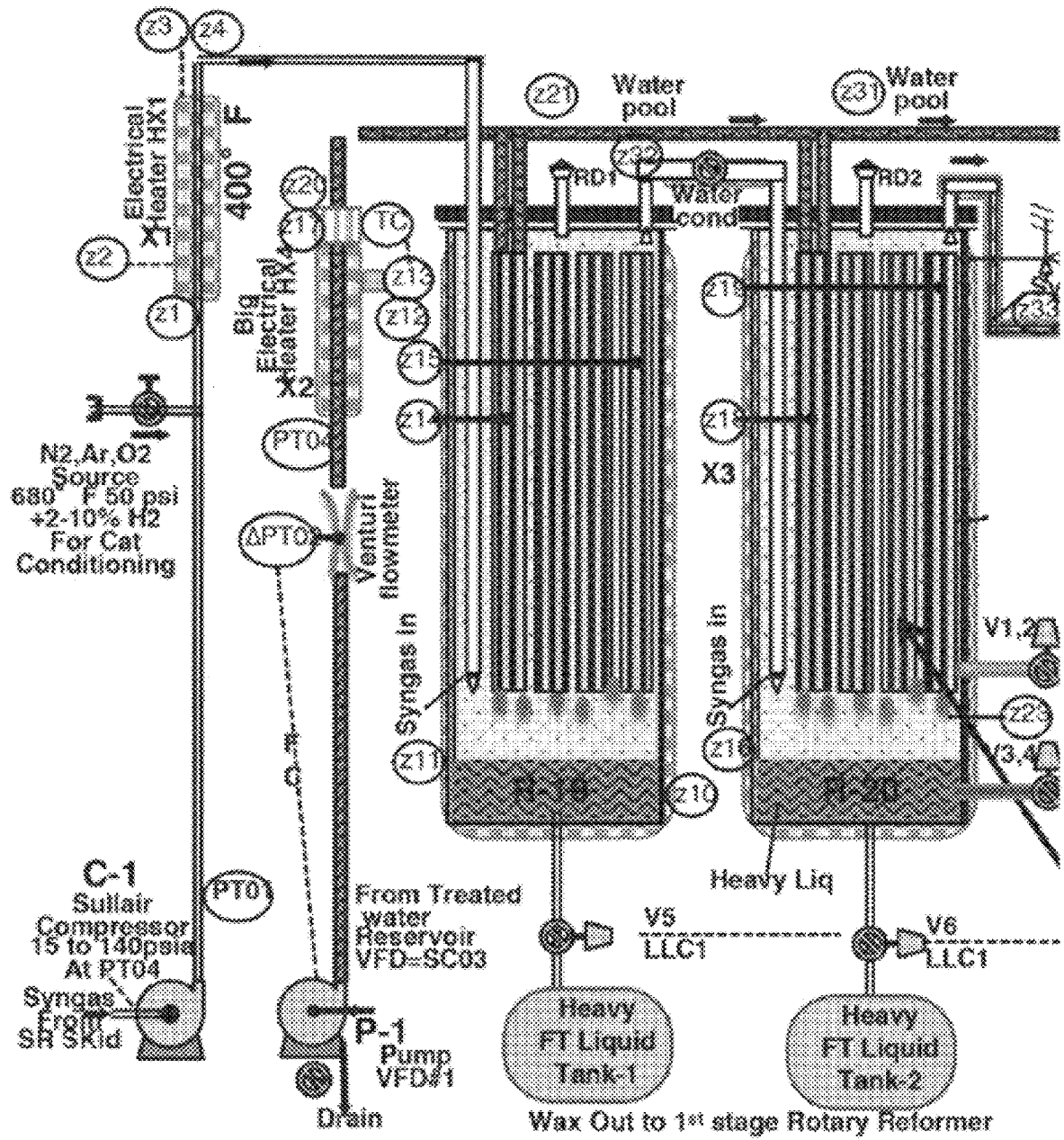
FIG. 12B is an enlargement of the left hand portion of FIG. 12A.
Figure 12C:
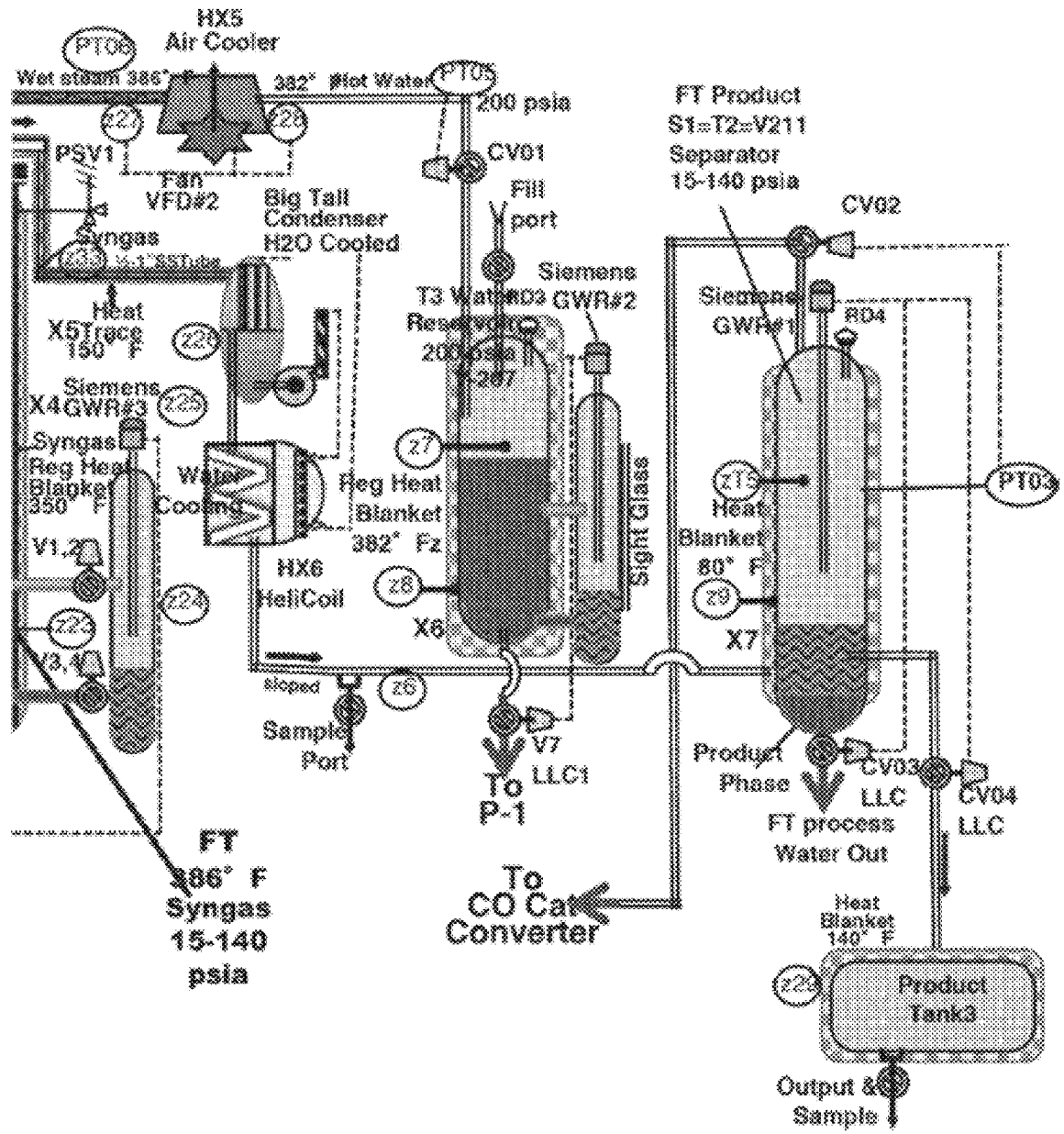
FIG. 12C is an enlargement of the right hand portion of FIG. 12A.
Figure 12D:
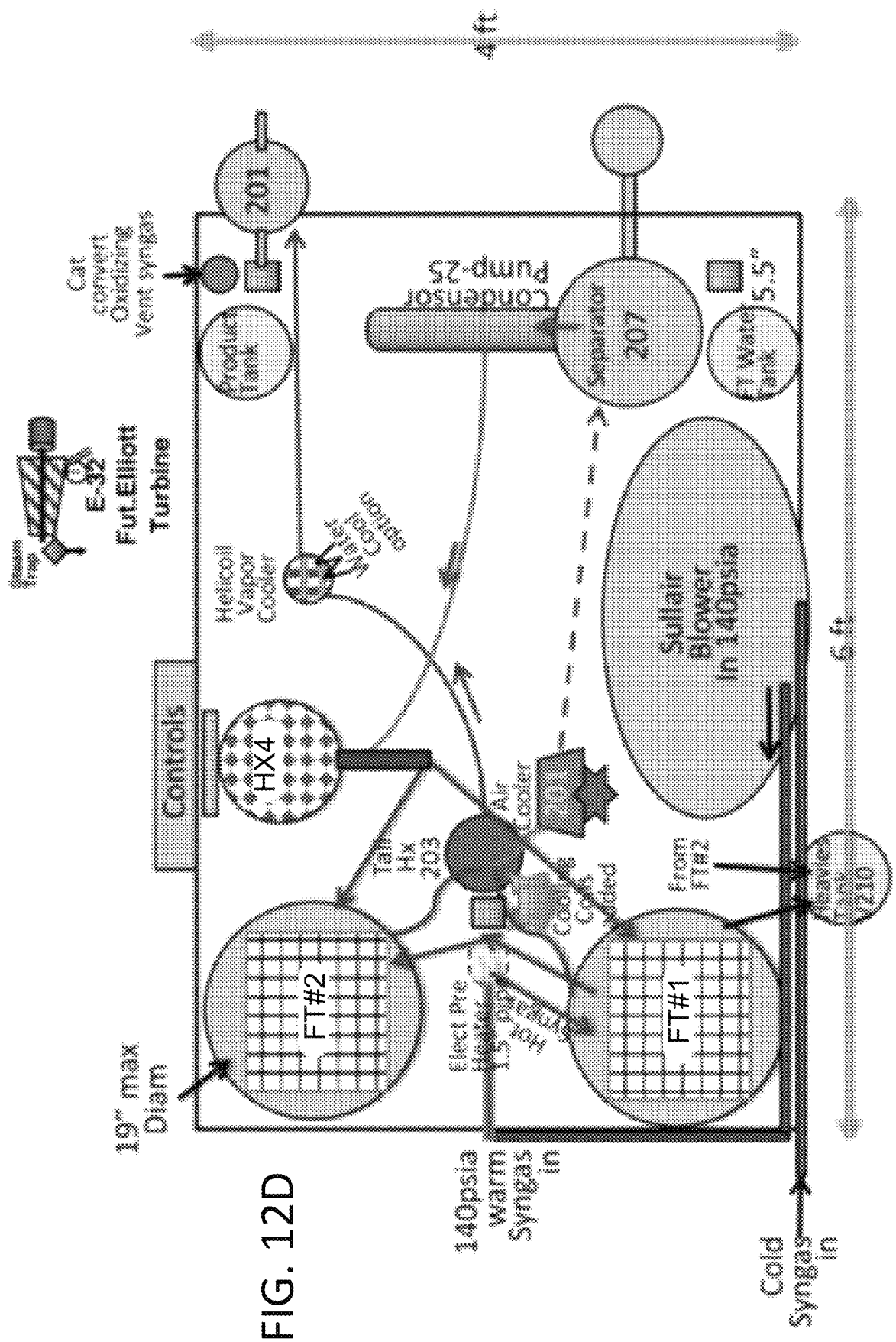
FIG. 12D: a schematic representation of a portion of the invention of FIG. 12A.
Figure 12E:
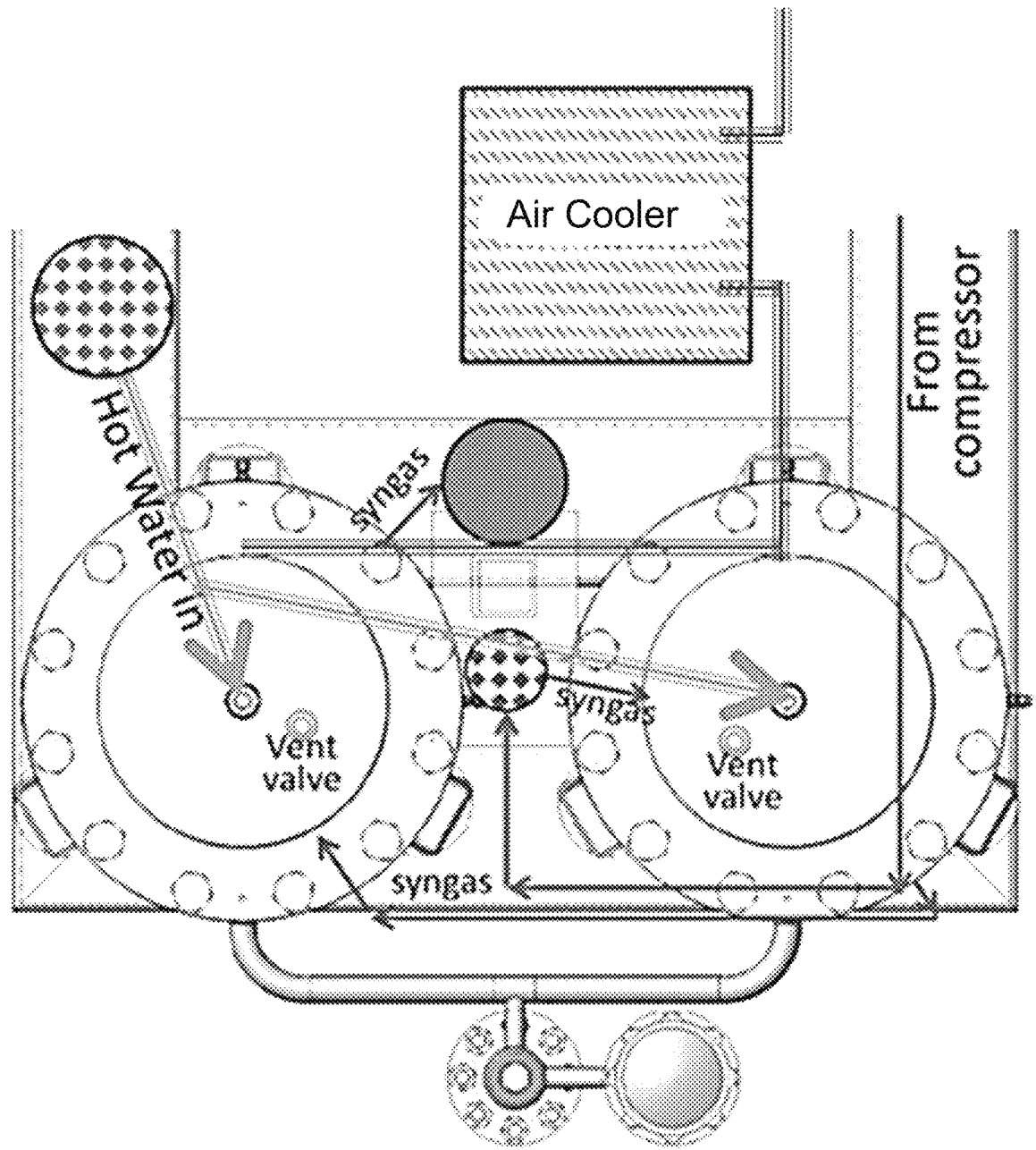
FIG. 12E: a schematic representation of a portion of the invention of FIG. 12A.

Referring now to FIG. 12A (FIGS. 12B and 12C are enlargements of the left and right sides of FIG. 12A, respectively), the Fischer-Tropsch process block is shown on the left side of the figure. The syngas enters at the lower left via a small compressor running at not more than 125 pounds-force per square inch gauge (psig), and in some embodiments, at about 125 psig. The entering syngas $H_2/CO$ ratio is controlled at a range of values, depending on the type of FT product desired, but generally ranges from 1.5 to 3.5, and, in some embodiments, is about 2.16. The two large FT reactors are in series with a water condenser between to achieve two stages on conversion. The reactors use vertical finned tubes with internal water flow and steam formation for cooling.

Next, the syngas is sampled and analyzed by gas chromatograph with thermal conductivity detector (GC-TCD) with a column for speciating this gas into its components of $H_2$, CO, $O_2$, $N_2$, $CO_2$, $CH_4$, $C_2H_4$, and $C_2H_2$, shown in the next figure. It is easily switched in mode into a mode for high $H_2$ sensitivity with argon carrier gas.

Testing Results Project Phase One: From 1/10th Scale Demonstrator.

The gas feedstock consisted of pipeline natural gas (96% $CH_4$ and 4% $C_2H_6$, and superheated steam. Start-up involved heating with air at 400° F., switching to $CO_2$ in various amounts until the oxygen content of the system dropped below 2% and then with SR at 1500° F. adding various amounts of superheated steam. The air-cooled condenser was switched on with SR at 1,500° F.

The testing protocol involved the following progressive steps working to increasing richer natural gas content of the feed gas.

Products from D2W Simulation: This example shows the calculated output production of $H_2$ and FT hydrocarbons from a process simulation using WinSim's D2W software.

TABLE 3

Output streams taken at distillation output stages

| Feedstock | Output | 7 tpd unit, Lbs/hr | 25 tpd unit, Lbs/hr |
|---|---|---|---|
| MSW | Hydrogen | 136 | 488 |
| | Naphtha | 56 | 198 |
| | Jet A | 461 | 1645 |
| | Diesel | 416 | 1486 |
| Natural Gas - Pipeline | Hydrogen | 258 | 922 |
| | Naphtha | 124 | 442 |
| | Jet A | 606 | 2164 |
| | Diesel | 840 | 3000 |

To maximize the lifetime of the reactor ceramics and alloys, the heat-up temperature is ramped cautiously at ~400° F./hr., or aggressively at ~900° F./hr., so it takes from about 2 to 5 hours to reach a good temperature around 1500° F.

Reformer Temperature:

One operational parameter relevant to the operation and maintenance cost of the full-size unit is the steam/$CO_2$ reformer (SR) operating temperature needed to obtain a high quality syngas at the proper $H_2$/CO ratio in the range of 1,200-1,600° F.

Figure 5C:
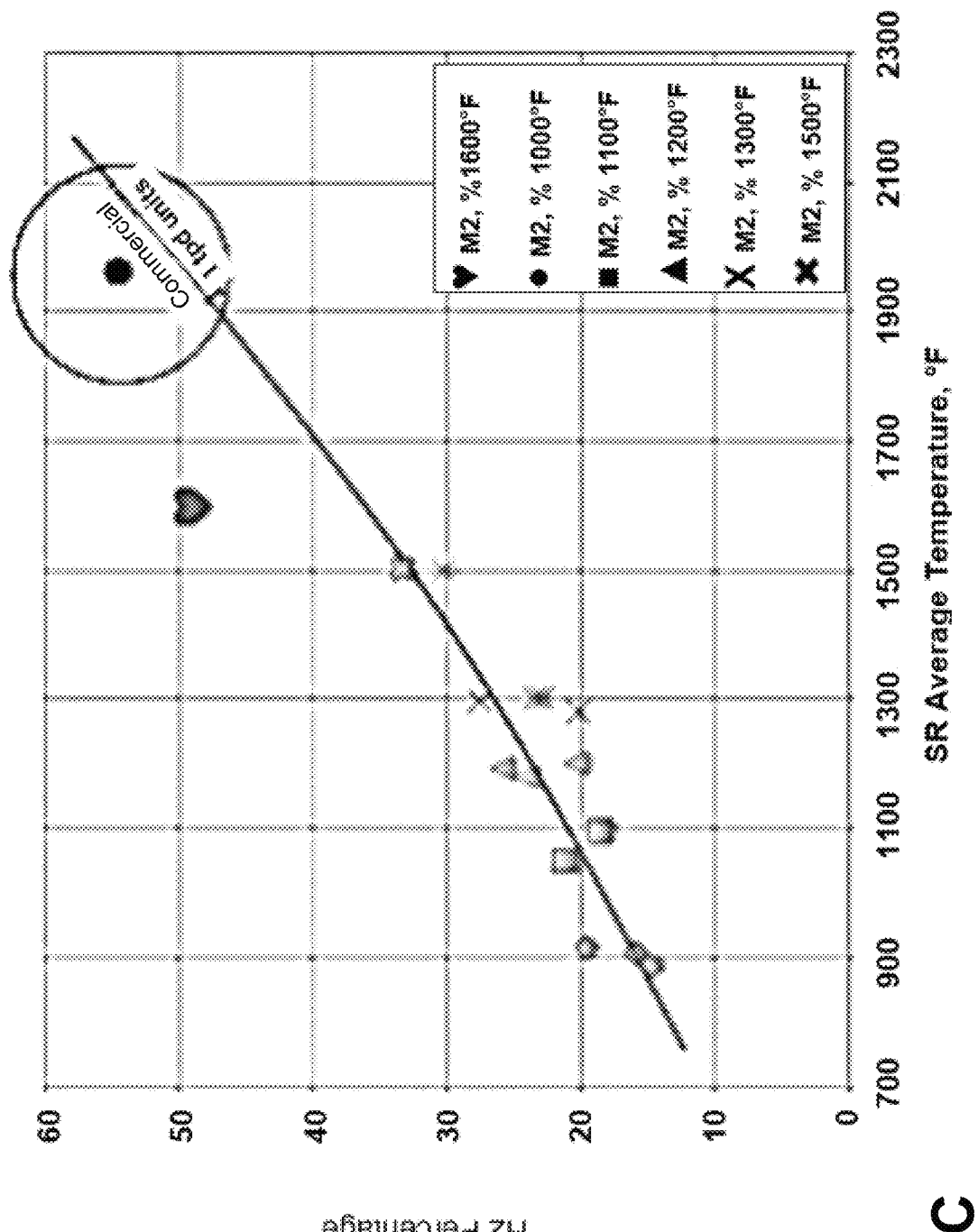

Above 900° F., FIG. 5C shows the near linear relationship of $H_2$% vs reformer reactor average temperature. We do not see a flattening at the top, suggesting that about 1,300° F. is the minimum temperature to reach 27% $H_2$ and 1,600° F. is the minimum temperature to reach our goal of 54% $H_2$ that will result in the required FT relationship of $H_2$/CO=2.16. Installation of the Mole Sieve column in the GC has shown the $H_2$ and CO data to obtain this ratio needed for FT.

Figure 13:
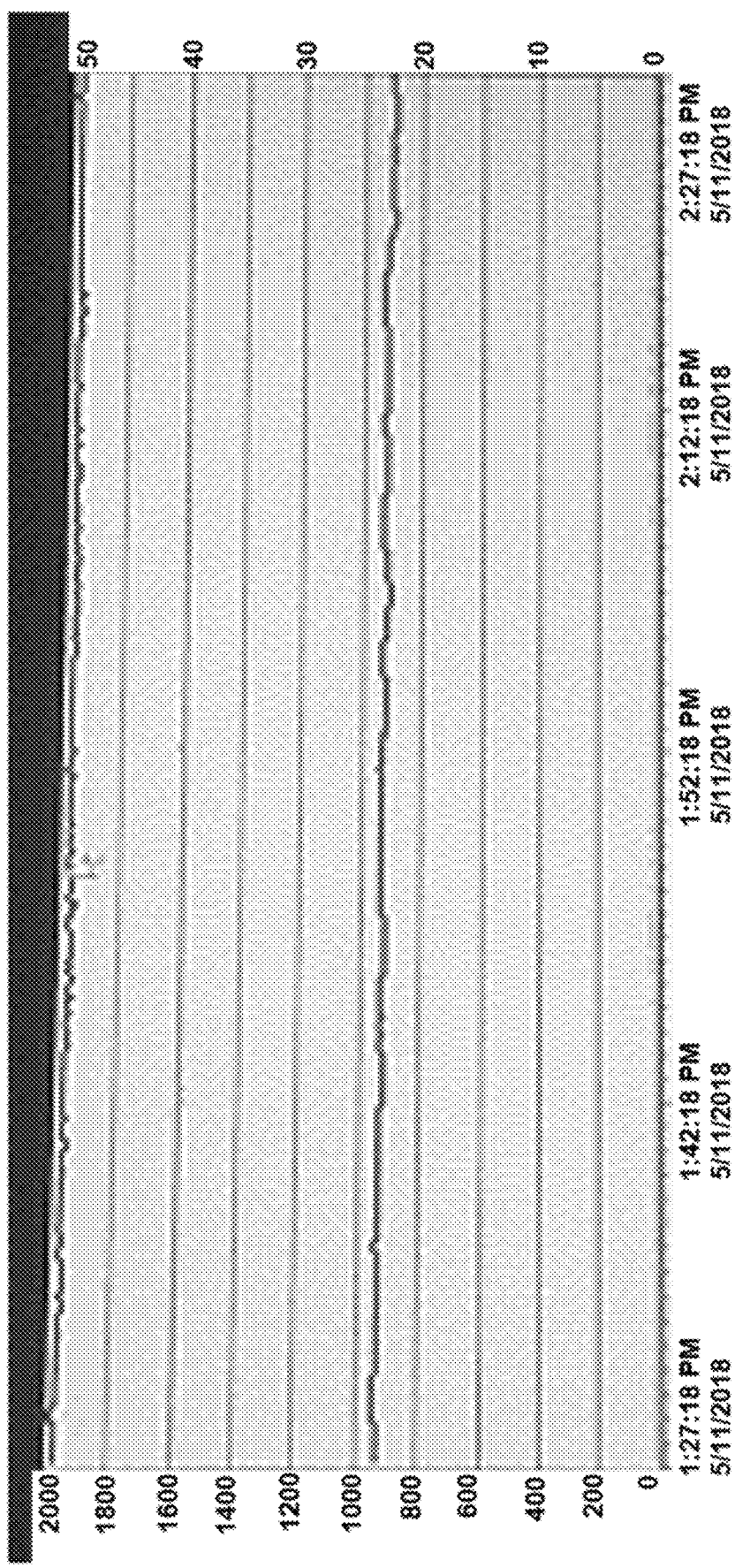
FIG. 13: $H_2$ Level Record of Steady 50%

As noted in FIGS. 3, 8, and 10, in some embodiments, SR are operated at 1850° F. However, FIG. 13 shows $H_2$ content in excess of 50% when operating SR at 1600° F. with a $H_2$/CO ratio of 2.15±0.5. As shown in FIG. 5C the typical operating temperature and $H_2$ yield for our past commercial 1 tpd to 2 tpd units was 55% $H_2$ at 2050° F. Feeding wellhead gas, $H_2$ peaks of 64% were reached with average of 52% varying only 0.5% over the daily run, while holding $H_2$/CO ratio at about 2.1. These were very steady. However, as shown in FIG. 5C, operation of SR at 1600° F. provided a $H_2$ percentage significantly higher than would be expected by the trend line of SR temperature vs. $H_2$ percentage.

The present invention provides an economic benefit from operating at a steam/$CO_2$ reformer temperature of about 1600° F. or not more than 1600° F., allowing the use of non-exotic alloys and more 316-L stainless steel in the construction of the reformer, while still providing the lowest superheated steam addition to achieve the required FT $H_2$/CO ratio.

Figure 14:
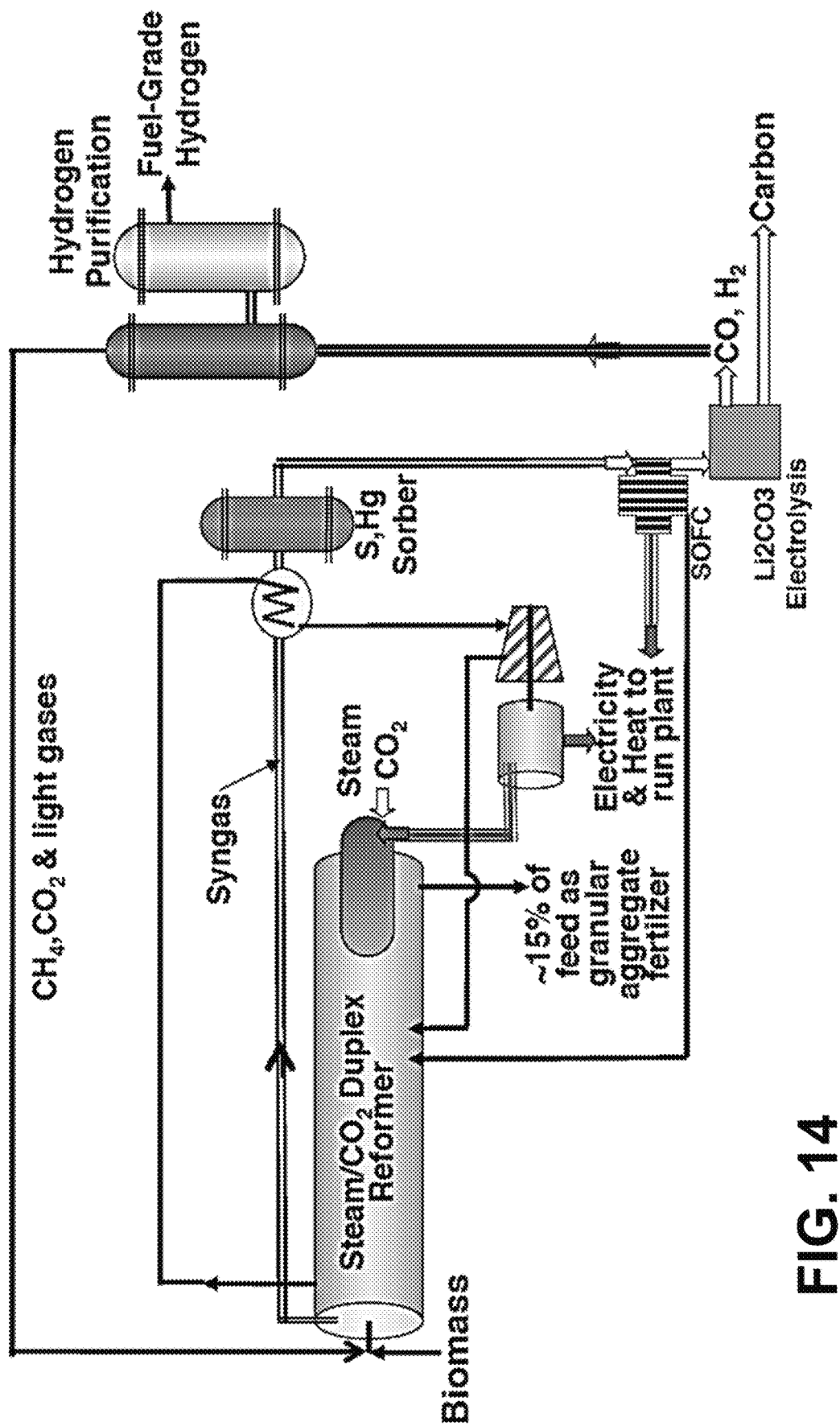
FIG. 14: a schematic representation of a steam and carbon dioxide reforming system according to another embodiment of the present invention.

FIG. 14 shows another embodiment that combines apparatus and methods discussed herein. This system shows a the duplex rotary reformer, a low BTU gas turbine handling syngas, a solid oxide fuel cell, and an electrolyzer making carbon or carbon products that sequester the carbon. This system achieves zero carbon production.

Various aspects of different embodiments of the present disclosure are expressed in paragraphs X1 or X2 as follows:

X1: One embodiment of the present disclosure includes a method of generating at least one of $H_2$ and Fischer Tropsch liquids, the method comprising receiving feedstock into an initial reformer; reforming, in the initial reformer, at least a portion of the feedstock with steam to produce an input gas, wherein an amount of the input gas is syngas; transferring the input gas from the initial reformer to a main reformer; reforming, in the main reformer, the input gas with steam to increase the amount of syngas; transferring the syngas from the main reformer to a Fischer Tropsch module; using the syngas in a Fischer Tropsch reaction; and extracting from the Fischer Tropsch module $H_2O$ and at least one of Fischer Tropsch liquids generated by the Fischer Tropsch reaction and $H_2$ generated by the Fischer Tropsch reactions.

X2: Another embodiment of the present disclosure includes a method of generating at least one of $H_2$ and Fischer Tropsch liquids, the method comprising receiving an input gas into a main reformer; reforming, in the main reformer, the input gas with steam to produce a syngas; transferring the syngas from the main reformer into a Fischer Tropsch module; using the syngas in a Fischer Tropsch reaction; and extracting from the Fischer Tropsch module $H_2O$ and at least one of Fischer Tropsch liquids generated by the Fischer Tropsch reactions and $H_2$ generated by the Fischer Tropsch reaction.

Yet other embodiments include the features described in any of the previous paragraphs X1 or X2 as combined with one or more of the following aspects:

Wherein the method further comprises transferring CO and $H_2$, and $CO_2$ generated by the Fischer Tropsch reaction to the main reformer.

Wherein the method further comprises transferring hydrocarbons containing at least five carbon atoms generated by the Fischer Tropsch reaction to the main reformer.

Wherein transferring the syngas from the main reformer into the Fischer Tropsch module further comprises condensing $H_2O$ from the syngas prior to the syngas entering the Fischer Tropsch module.

Wherein the syngas, when transferred into the Fischer Tropsch module, has a $H_2$/CO ratio between 1.5 to 3.5.

Wherein the $H_2$/CO ratio is about 2.1.
Wherein the $H_2$/CO ratio is about 2.16.
Wherein the $H_2$/CO ratio is 2.16.
Wherein the $H_2$/CO ratio is about 2.3.
Wherein the $H_2$/CO ratio is 2.3.
Wherein the syngas, is transferred into the Fischer Tropsch module at a pressure not more than 125 psig.

Wherein the syngas, is transferred into the Fischer Tropsch module at a pressure of about 125 psig Wherein the initial reformer is a rotary reformer.

Wherein the method further comprises receiving, into a rotary reformer, a waste stream and steam; generating, in the rotary reformer, the input gas; and transferring the input gas from the rotary reformer to the main reformer.

Wherein the rotary reformer has a rotary reformer operating temperature, and wherein the main reformer has a main reformer operating temperature greater than the rotary reformer operating temperature.

Wherein the method further comprises extracting sulfur from the input gas by contacting the input gas with lime.

Wherein the method further comprises extracting sulfur from the input gas by passing the input gas along a ZnO sorbent bed.

Wherein the method further comprises removing lime, using the rotary reformer.

Wherein the feedstock comprises at least one of municipal solid waste, medical waste, digestate, and natural gas.

Wherein the waste stream comprises at least one of municipal solid waste, medical waste, and digestate.

Wherein the waste stream further comprises biogas.

Wherein the feedstock further comprises biogas.

Wherein the digestate has a moisture content of 24% to 70% by weight.

Wherein the digestate has a moisture content of about 50% by weight.

Wherein the initial reformer is a cyclonic separator.

Wherein the method further comprises receiving, into a cyclonic separator, natural gas and steam; separating, in the cyclonic separator, liquids from the natural gas and steam; and transferring the natural gas and steam from the cyclonic separator as input gas to the main reformer.

Wherein the cyclonic separator has a cyclonic separator operating temperature, and wherein the main reformer has a main reformer operating temperature greater than the cyclonic separator operating temperature.

Wherein the main reformer has a main reformer operating temperature of 1300° F. to 1600° F.

Wherein the main reformer has a main reformer operating temperature equal to or less than 1600° F.

Wherein the main reformer has a main reformer operating temperature of 1300° F. to 1600° F.

Wherein the main reformer has a main reformer operating temperature of about 1600° F.

Wherein the steam is supplied to the main reformer.

Wherein water is added to the main reformer and the steam is generated within the main reformer.

Wherein the steam is generated within the main reformer using water present in the waste stream.

Wherein combustion fails to occur in the initial reformer and in the main reformer.

Wherein pressure in the initial reformer and the main reformer is maintained at about one atmosphere.

The foregoing detailed description is given primarily for clearness of understanding and no unnecessary limitations are to be understood therefrom for modifications can be made by those skilled in the art upon reading this disclosure and may be made without departing from the spirit of the invention. While this invention is discussed primarily in connection with the detection of lung cancer, it should be understood that cancers not primary to the lung or cancers that have not metastasized to the lung may also be detected. Furthermore, it should be understood the different biomarkers or other data may be used to generate initial classification probabilities.

What is claimed is:

1. A method of generating at least one of $H_2$ and Fischer Tropsch liquids, the method comprising:
   receiving feedstock into an initial reformer;
   reforming, in the initial reformer, at least a portion of the feedstock with steam to produce an input gas, wherein an amount of the input gas is syngas;
   extracting sulfur from the input gas in the initial reformer;
   transferring the input gas from the initial reformer to a main reformer;
   reforming, in the main reformer, the input gas with steam to increase the amount of syngas;
   transferring the syngas from the main reformer to at least one of a Fischer Tropsch module for generation of Fischer Tropsch liquids by using the syngas in a Fischer Tropsch reaction and a hydrogen generation module, the hydrogen generation module comprising a pressure swing adsorption (PSA) unit and a water gas shift (WGS) unit, for generation of $H_2$ by using the syngas; and
   extracting at least one of Fischer Tropsch liquids generated by the Fischer Tropsch module and $H_2$ generated by the hydrogen generation module.

2. The method of claim 1, further comprising transferring CO, $H_2$, and $CO_2$ from the Fischer Tropsch module directly to the main reformer.

3. The method of claim 2, further comprising transferring hydrocarbons containing at least five carbon atoms generated by the Fischer Tropsch reaction to the main reformer.

4. The method of claim 1, wherein transferring the syngas from the main reformer into the Fischer Tropsch module further comprises condensing $H_2O$ from the syngas prior to the syngas entering the Fischer Tropsch module.

5. The method of claim 1, wherein the step of extracting sulfur from the input gas in the initial reformer comprises extracting sulfur from the input gas in the initial reformer by contacting the input gas with lime in the initial reformer.

6. The method of claim 1, wherein the initial reformer is a rotary reformer.

7. The method of claim 5, wherein the rotary reformer has a rotary reformer operating temperature, and wherein the main reformer has a main reformer operating temperature greater than the rotary reformer operating temperature.

8. The method of claim 5, wherein the step of extracting sulfur from the input gas in the initial reformer comprises extracting sulfur from the input gas in the rotary reformer by contacting the input gas with lime in the rotary reformer.

9. The method of claim 7, further comprising removing lime, using the rotary reformer.

10. The method of claim 1, wherein the feedstock comprises at least one of municipal solid waste, medical waste, digestate, and natural gas.

11. The method of claim 10, wherein the feedstock further comprises biogas and is substantially oxygen-free.

12. The method of claim 10, wherein the digestate has a moisture content of 24% to 70% by weight.

13. The method of claim 1, wherein the initial reformer is a cyclonic separator, and wherein the feedstock comprises natural gas.

14. The method of claim 13, wherein the cyclonic separator has a cyclonic separator operating temperature, and wherein the main reformer has a main reformer operating temperature greater than the cyclonic separator operating temperature.

15. The method of claim 1, wherein the main reformer has a main reformer operating temperature equal to or less than 1600° F.

16. The method of claim 1, wherein the reforming in the initial reformer does not include combustion and wherein the reforming in the main reformer does not include combustion.

17. The method of claim 1, wherein pressure in the initial reformer and the main reformer is maintained at about one atmosphere.

18. A method of generating at least one of $H_2$ and Fischer Tropsch liquids, the method comprising:

receiving feedstock into an initial reformer;

reforming, in the initial reformer, at least a portion of the feedstock with steam to produce an input gas, wherein an amount of the input gas is syngas;

transferring the input gas from the initial reformer to a main reformer; reforming, in the main reformer, the input gas with steam to increase the amount of syngas, wherein the syngas includes CO, $H_2$, and $H_2O$;

transferring the syngas from the main reformer to a Fischer Tropsch module;

using the syngas in a Fischer Tropsch reaction; and extracting from the Fischer Tropsch module $H_2O$, CO, $H_2$ and $CO_2$ and Fischer Tropsch liquids; and transferring CO, $H_2$, and $CO_2$ directly to the main reformer.

* * * * *